United States Patent
Yoshihara et al.

(10) Patent No.: US 7,312,774 B1
(45) Date of Patent: Dec. 25, 2007

(54) LIQUID CRYSTAL DISPLAY DEVICE

(75) Inventors: Toshiaki Yoshihara, Kawasaki (JP);
Tetsuya Makino, Kawasaki (JP);
Keiichi Betsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 582 days.

(21) Appl. No.: 10/722,293

(22) Filed: Nov. 25, 2003

(30) Foreign Application Priority Data

Dec. 13, 2002 (JP) ............................. 2002-362346

(51) Int. Cl.
*G09G 3/36* (2006.01)
(52) U.S. Cl. ........................... 345/87; 345/90; 345/97; 345/205; 345/690
(58) Field of Classification Search ................. 345/87, 345/90, 97, 205, 690
See application file for complete search history.

(56) References Cited

U.S. PATENT DOCUMENTS 4,773,716 A * 9/1988 Nakanowatari .............. 345/97
6,278,426 B1 * 8/2001 Akiyama ..................... 345/87
6,972,777 B2 * 12/2005 Shigeta ....................... 345/690

FOREIGN PATENT DOCUMENTS

JP          11-119189          4/1999

OTHER PUBLICATIONS

Yoshihara et al.; "A Full-color FLC Display Based on Field Sequential Color with TFTs"; *AM-LCD '99 Digest of Technical Papers*; pp. 185-188; Jul. 14-16, 1999.
Yoshihara et al.; "Invited Papers: A 254-ppi Full-color Video Rate TFT-LCD Based on Field Sequential Color and FLC Display"; *SID '00 Digest of Technical Papers*; pp. 1176-1177; May 2000.

* cited by examiner

*Primary Examiner*—Richard Hjerpe
*Assistant Examiner*—Leonid Shapiro
(74) *Attorney, Agent, or Firm*—Greer, Burns & Crain, Ltd.

(57) ABSTRACT

In each sub-frame, data writing scanning is performed twice continuously, and then data erasing scanning is performed twice continuously. The applied voltage in the data writing scanning and the applied voltage in the data erasing scanning are substantially equal in magnitude, but opposite in polarity. After a response of the liquid crystal by the first application of voltage, the cell charge decreases and the responsiveness of liquid crystal decreases. However, with the second application of voltage of the same polarity, charges corresponding to the applied voltage are stored again in the liquid crystal cell, and the liquid crystal responds again. A display of a greater number of grayscales than the number of output grayscales of a driver is achieved according to a combination of magnitude of voltages to be applied to the liquid crystal a plurality of times within each sub-frame.

18 Claims, 18 Drawing Sheets

FIG. 5

N: NUMBER OF WRITING TIMES
M: NUMBER OF OUTPUT GRAYSCALES (a) 0 GRAYSCALE (b) 1 GRAYSCALE ... (M−1) GRAYSCALE (c) M GRAYSCALE ... 2(M−1) GRAYSCALE (d) {(N−1)(M−1)+1} GRAYSCALE ... N(M−1) GRAYSCALE

LIQUID CRYSTAL DISPLAY DEVICE

BACKGROUND OF THE INVENTION

The present invention relates to a liquid crystal display device for displaying an image by using a liquid crystal material having spontaneous polarization and on/off driving of switching elements.

Along with the recent development of so-called information-oriented society, electronic apparatuses, such as personal computers and PDA (Personal Digital Assistants), have been widely used. With the spread of such electronic apparatuses, portable apparatuses that can be used in offices as well as outdoors have been used, and there are demands for small-size and light-weight of these apparatuses. Liquid crystal display devices are widely used as one of the means to satisfy such demands. Liquid crystal display devices not only achieve small size and light weight, but also include an indispensable technique in an attempt to achieve low power consumption in portable electronic apparatuses that are driven by batteries.

The liquid crystal display devices are mainly classified into the reflection type and the transmission type. In the reflection type liquid crystal display devices, light rays incident from the front face of a liquid crystal panel are reflected by the rear face of the liquid crystal panel, and an image is visualized by the reflected light; whereas in the transmission type liquid crystal display devices, the image is visualized by the transmitted light from a light source (back-light) placed on the rear face of the liquid crystal panel. Since the reflection type liquid crystal display devices have poor visibility because the reflected light amount varies depending on environmental conditions, transmission type color liquid crystal display devices are generally used as display devices of personal computers that display full-color images.

As the color liquid crystal display devices, TN (Twisted Nematic) type color liquid crystal display devices using switching elements such as a TFT (Thin Film Transistor) are widely used. Although the TFT-driven TN type liquid crystal display devices have better display quality compared to an STN (Super Twisted Nematic) type, they require a back-light with high intensity to achieve high screen brightness because the light transmittance of the liquid crystal panel is only 4% or so at present. For this reason, a lot of power is consumed by the back-light. Moreover, since a color display is achieved using color filters, a single pixel needs to be composed of three sub-pixels, and there are problems that it is difficult to provide a high-definition display, and the purity of the displayed colors is not sufficient.

In order to solve such problems, the present inventor et al. developed field-sequential type liquid crystal display devices (see, for example, T. Yoshihara, et. al., AM-LCD '99 Digest of Technical Papers, p. 185, 1999; T. Yoshihara, et. al., SID '00 Digest of Technical Papers, p. 1176, 2000). Since such a field-sequential type liquid crystal display device does not require sub-pixels, it is possible to easily realize a higher definition display compared to color-filter type liquid crystal display devices. Moreover, since a field-sequential type liquid crystal display device can use the color of light emitted by the light source as it is for display without using a color filter, the displayed color has excellent purity. Furthermore, since the light utilization efficiency is high, the field-sequential type liquid crystal display device has the advantage of low power consumption. However, in order to realize a field-sequential type liquid crystal display device, high-speed responsiveness (2 ms or less) of liquid crystal is essential.

In order to provide a field-sequential type liquid crystal display device with significant advantages as mentioned above or increase the speed of response of a color-filter type liquid crystal display device, the present inventor et al. are conducting research and development on the driving of liquid crystal such as a ferroelectric liquid crystal having spontaneous polarization, which may achieve 100 to 1000 times faster response compared to a prior art, by a switching element such as a TFT (Thin Film Transistor). In the ferroelectric liquid crystal, as shown in FIG. 1, with the application of voltage, the long-axis direction of the liquid crystal molecule is tilted. A liquid crystal panel sandwiching the ferroelectric liquid crystal therein is sandwiched by two polarization plates whose polarization axes are orthogonal to each other, and the intensity of the transmitted light is changed using the birefringence caused by the change in the long-axis direction of the liquid crystal molecule.

FIG. 2 shows an example of time chart of display control in a conventional field-sequential type liquid crystal display device. FIG. 2(a) shows the scanning timing of each line of the liquid crystal panel, and FIG. 2(b) shows the ON timing of red, green and blue colors of the back-light. One frame is divided into three sub-frames, and, for example, as shown in FIG. 2(b), red light is emitted in the first sub-frame, green light is emitted in the second sub-frame, and blue light is emitted in the third sub-frame.

Meanwhile, as shown in FIG. 2(a), for the liquid crystal panel, image data writing scanning and erasing scanning are performed within a sub-frame of each of red, green and blue colors, However, the timings are adjusted so that the start timing of writing scanning coincides with the start timing of each sub-frame, and the end timing of erasing scanning coincides with the end timing of each sub-frame, and the time required for each of the writing scanning and the erasing scanning is set to a half of each sub-frame. During the writing scanning and the erasing scanning, voltages corresponding to the same image data, which are equal in magnitude and different in polarity, are applied to the liquid crystal panel (see, for example, Japanese Patent Application Laid-Open No. 11-119189/1999).

Accordingly, when a voltage of one polarity is applied in the writing scanning, a bright display is provided, while, when a voltage of the other polarity is applied in the erasing scanning, a substantially black display is provided. More precisely, even after the erasing scanning, the same image as that displayed after the writing scanning is displayed with very low brightness compared to the image after the writing scanning. Note that in this specification, scanning for obtaining a display image with high brightness is called "writing scanning", while, scanning for obtaining an image with low brightness, or an image perceived as a black image, is called "erasing scanning".

A field-sequential type liquid crystal display device as described above has high light utilization efficiency and can reduce the consumption of power compared to a color-filter type liquid crystal display device. However, in the case where a ferroelectric liquid crystal is used as a liquid crystal material, since the ferroelectric liquid crystal has spontaneous polarization, if it is driven by a switching element such as a TFT, it is necessary to store charges necessary for reversing the spontaneous polarization in a liquid crystal cell through the switching element, and consequently a higher voltage is required compared to ordinary nematic liquid crystal. Moreover, a large storage capacity is necessary for storing charges. These problems also occur in a color-filter type liquid crystal display device using a ferroelectric liquid crystal, and there is a demand for a lower drive voltage. In other words, it is desired to realize a high light transmittance with a lower voltage.

On the other hand, in order to improve the display quality, there is an increasing demand for the realization of a greater number of display colors (multi-level grayscale display). However, since a liquid crystal display device employs an analog grayscale, when the number of grayscale levels is increased, the potential difference between grayscale levels decreases. Thus, from the point of view of the liquid crystal response and an output variation of the driver, there is a problem that it is difficult to achieve a multi-level grayscale display.

BRIEF SUMMARY OF THE INVENTION

The present invention has been made with the aim of solving the above problems, and it is an object of the present invention to provide a liquid crystal display device capable of realizing a high light transmittance even with a low drive voltage.

Another object of the present invention is to provide a liquid crystal display device capable of easily realizing a multi-level grayscale and improving display quality.

A liquid crystal display device according to a first aspect is a liquid crystal display device having a liquid crystal material with spontaneous polarization sealed between a common electrode and a plurality of pixel electrodes, and switching elements provided to correspond with the plurality of pixel electrodes, respectively, and comprises means for applying voltage of same polarity to the liquid crystal material through the switching elements a plurality of times continuously within one period.

In the first aspect, within one period (within a frame (not more than $1/60$ s) in the case of a color-filter method, or within a sub-frame (not more than $1/180$ s) in the case of a field-sequential method), voltage of the same polarity is applied through the switching elements to the liquid crystal material two or more times continuously.

As shown in FIG. 3, the liquid crystal having spontaneous polarization responds because the charge (cell charge) stored in the liquid crystal cell by the application of voltage when the gate is ON is redistributed by a response of the spontaneous polarization when the gate is OFF.

Hence, like the first aspect, when the voltage of the same polarity is applied to the liquid crystal material through the switching elements two or more times at a predetermined interval, as shown in FIG. 4, the liquid crystal shows a response corresponding to the voltage application, and it is possible to realize a high light transmittance without increasing the drive voltage. The reason for this is that the cell charge decreases and the responsiveness of liquid crystal decreases after a response of the liquid crystal by the nth (n: natural number) application of voltage, but, with the next (n+1)th application of voltage of the same polarity, charges corresponding to the applied voltage are stored again in the liquid crystal cell and the liquid crystal responds again.

Accordingly, by applying voltage of the same polarity to the liquid crystal material through the switching elements a plurality of times within one period (frame or sub-frame), it is possible to improve the light transmittance, i.e., brightness, without increasing the drive voltage while maintaining the high-speed responsiveness of the liquid crystal having spontaneous polarization. Note that, when voltage of the same polarity is applied over one period (frame or sub-frame), although the light transmittance is improved, the high-speed responsiveness of the liquid crystal having spontaneous polarization deteriorates, and therefore the responsiveness deteriorates in the case of the color filter method, or mixture of colors occurs in the case of the field-sequential method. It is thus necessary to apply voltage of the same polarity a plurality of times within one frame (frame or sub-frame).

The selection time of the switching element, for example, the gate selection period if the switching element is a TFT, in applying the voltage of the same polarity to the liquid crystal through the switching element a plurality of times within one period (frame or sub-frame) is preferably as short as possible, and more preferably 5 µs or less. The reason for this is that by decreasing the response of liquid crystal in the gate selection period as small as possible, it becomes possible to achieve a stable half-tone display according to the voltage value. In particular, the difference in the redistributed amount of stored charge due to the difference in the responsiveness when the polarity of the applied voltage is varied becomes smaller, and thus it is possible to reduce the deviation of the applied voltage and prevent images from being burnt into the screen.

A liquid crystal display device of a second aspect is the device of the first aspect, wherein the voltages applied to the liquid crystal material by the plurality of times of voltage application are equal in magnitude. In the second aspect, the voltages applied to the liquid crystal material by the plurality of times of voltage application are all equal in magnitude. Hence, there is no need to create new data of different type, and the light transmittance can be easily improved by the plurality of times of application of voltage of the same polarity corresponding to the same display data.

A liquid crystal display device of a third aspect is the device of the first aspect, wherein at least two voltages among the voltages applied to the liquid crystal material by the plurality of times of voltage application are different in magnitude. In the third aspect, the magnitudes of all the voltages applied to the liquid crystal material by the plurality of times of voltage application are not necessary equal in magnitude, and a multi-level grayscale display is achieved by varying the magnitude of the applied voltage.

A liquid crystal display device of a fourth aspect is the device of the third aspect, wherein a magnitude of the voltage applied for the (n+1)th (n: natural number) time is not less than a magnitude of the voltage applied for the nth time. A liquid crystal display device of a fifth aspect is the device of the third aspect, wherein a magnitude of the voltage applied for the (n+1)th (n: natural number) time is not less than a magnitude of the voltage of the liquid crystal material just before the (n+1)th application of voltage after the nth application of voltage.

In the fourth aspect, for the (n+1)th time, a voltage not less than a voltage applied for the previous nth time is applied. Whereas, in the fifth aspect, for the (n+1)th time, a voltage not less than a voltage value in the liquid crystal cell just before the (n+1)th application of voltage after the nth application of voltage is applied. Therefore, since the light transmittance by the (n+1)th application of voltage becomes substantially equal to or higher than the light transmittance by the nth application of voltage, it is possible to display a greater number of grayscales than the number of output grayscales of a driver in a stable manner. In the case of a liquid crystal having spontaneous polarization, it is easy to increase the light transmittance by the application of voltage of the same polarity, but it is difficult to decrease the light transmittance to an intermediate value. However, in the fourth and fifth aspects, such an intermediate light transmittance is easily realized. The ideal value for the magnitude of voltage applied for the (n+1)th time is not less than a voltage value of the liquid crystal cell just before the (n+1)th application of voltage after the nth application of voltage. With this voltage value, it is possible to easily make the light transmittance in the nth application and that in the (n+1)th application substantially equal. Hence, although the fifth aspect is ideal, since the voltage value of the liquid crystal cell just before the (n+1)th application of voltage varies due to temperature, it is difficult to find the voltage value, and the fifth aspect has a drawback that it is difficult to control the applied voltage. On the other hand, as in the fourth aspect, if the voltage applied for the (n+1)th time is not less than the voltage applied for the nth time, the voltage value of the (n+1)th application is definitely larger than the voltage value of the liquid crystal cell just before the (n+1)th application of voltage after the nth application of voltage, and thus it is easy to control the applied voltage. However, the fourth aspect has a drawback that it is difficult to make the light transmittance in the nth application and that in the (n+1)th application equal, and it is especially difficult to control the light transmittance in the nth application and that in the (n+1)th application to have an equal intermediate value. Thus, since the fourth aspect and the fifth aspect have mutually contradictory advantages and disadvantages, either of the techniques may be selected according to a condition.

A liquid crystal display device of a sixth aspect is the device of the first aspect, wherein a combination of magnitude of voltages to be applied to the liquid crystal material a plurality of times is set so as to display a predetermined grayscale level. A liquid crystal display device of a seventh aspect is the device of the sixth aspect, wherein a greater number of grayscales are displayed compared to the number of output grayscales of the means for applying voltage to the liquid crystal material. A liquid crystal display device of an eighth aspect is the device of the sixth aspect, wherein, if the number of times of application of voltage of same polarity to the liquid crystal material within one period is N times (N: natural number), lowest grayscale levels are displayed by the Nth application of voltage, higher grayscale levels than the grayscale levels displayed by the Nth application of voltage are sequentially displayed by a combination of the Jth ($2 \leq j \leq N$) through Nth applications of voltage, and highest grayscale levels are displayed by a combination of the 1st through Nth applications of voltage.

In the sixth aspect, a display of a predetermined grayscale level is achieved according to a combination of magnitude of voltages to be applied to the liquid crystal material a plurality of times. In the seventh aspect, a display of a greater number of grayscales than the number of output grayscales of the means for applying voltage (driver) is achieved according to a combination of magnitude of voltages to be applied to the liquid crystal material a plurality of times.

A display of multi-level grayscale of the eighth aspect will be explained. If the number of times of application of voltage of same polarity within one period (frame or sub-frame) is N times, the lowest grayscale levels are displayed by the Nth application of voltage, higher grayscale levels than the grayscale levels displayed by the Nth application of voltage are displayed by a combination of the (N−1)th and Nth applications of voltage, higher grayscale levels than the grayscale levels displayed by the combination of the (N−1)th and Nth applications of voltage are displayed by a combination of the (N−2)th, (N−1)th and Nth applications of voltage, and similarly higher grayscale levels are displayed sequentially by increasing the number of times of voltage application to be used so that the highest grayscale levels are displayed by a combination of the 1st through Nth applications of voltage.

Thus, a grayscale display is realized by the N times of application of voltage of the same polarity. FIG. 5 shows an example of a grayscale display, where N is the number of times of application of voltage, and M is the number of output grayscales of the driver. For the 0 grayscale, all the applied voltages are 0 (FIG. 5(a)). With the Nth application of voltage (the applied voltages from the first time to the (N−1)th time are 0), the lowest grayscale levels from the 1 grayscale to the (M−1) grayscale are displayed (FIG. 5(b)). Further, with a combination of the (N−1)th application of varying voltage and the Nth application of fixed voltage (the applied voltages from the first time to the (N−2)th time are 0), the M grayscale to the 2(M−1) grayscale are displayed (FIG. 5(c)). Subsequently, the respective grayscales are displayed in the same manner, and the highest grayscale levels from the $\{(N-1)(M-1)+1\}$ grayscale to the N(M−1) grayscale are displayed by a combination of the first application of varying voltage and the second through Nth applications of fixed voltage (FIG. 5(d)). Accordingly, grayscales levels from the 0 grayscale to the N(M−1) grayscale (the number of grayscales: N(M−1)+1) can be displayed at maximum, thereby achieving a high quality display.

For example, when N=4 and M=256 (8 bits), i.e., when the application of voltage of the same polarity is performed four times by an 8-bit driver, it is possible to display 0 to 1020 (the number of grayscales: 1021). When this is utilized for a color display, it is possible to significantly increase the number of display colors from 16,777,216 (=256³) by 256 grayscales to 1,064,332,261 (=1021³) by 1021 grayscales, and achieve a display equivalent to that of a 10-bit driver by the 8-bit driver.

A liquid crystal display device of a ninth aspect is any one of the devices of the first through eighth aspects, and comprises means, after voltages of same polarity are applied to the liquid crystal material a plurality of times, for applying reverse voltages, which are reversed in polarity and equal in magnitude with respect to the applied voltages, to the liquid crystal material the same number of times as the plurality of times.

A liquid crystal display device of a tenth aspect is the device of the ninth aspect, wherein the order of magnitude of the reverse voltages is opposite to the order of magnitude of the voltage of same polarity.

In the ninth aspect, after voltages of one polarity are applied a plurality of times, voltages of the other polarity are applied with the same magnitude and the same number of times as the voltages of the one polarity. It is therefore possible to reduce the deviation of voltage applied to the liquid crystal, prevent images from being burnt into the display, and realize a highly reliable display. Like the tenth aspect, as shown in FIG. 6A, the order of magnitude of applied voltages of the other polarity in data erasing scanning is preferably opposite to the order of magnitude of applied voltages of the one polarity in data writing scanning. The reason for this is that, if these orders are the same, the response from white to black becomes poorer, particularly when 0 voltage is applied in the data erasing scanning after the application of high voltage in the data writing scanning as shown in FIG. 6B.

A liquid crystal display device of an eleventh aspect is the device of the ninth or tenth aspect, wherein a back-light is turned off in synchronism with the end of the first application of reverse voltage. In the eleventh aspect, at the end of the first application of voltage in the data erasing scanning in which the voltage with the reversed polarity and equal magnitude is applied, the back-light is turned off. It is therefore possible to minimize the ON time of the back-light and reduce the consumption of power. Moreover, since the back-light is turned off, black brightness decreases, thereby enabling an improvement in the contrast of display.

A liquid crystal display device of a twelfth aspect is a liquid crystal display device having a liquid crystal material with spontaneous polarization sealed between a common electrode and a plurality of pixel electrodes, and switching elements provided to correspond with the plurality of pixel electrodes, respectively, wherein the device is switchable between a first mode in which voltage of same polarity is applied to the liquid crystal material through the switching elements a plurality of times continuously within one period and a second mode in which voltage of same polarity is applied to the liquid crystal material through the switching elements once within one period.

In the twelfth aspect, it is possible to switch between the first mode in which voltage of the same polarity is applied to the liquid crystal material through the switching elements a plurality of times within one period (frame or sub-frame) and the second mode in which voltage of the same polarity is applied to the liquid crystal material through the switching elements only once within one period. It is therefore possible to change the drive sequence according to applications. For example, in order to increase the display quality, it is possible to select the first mode in which the number of times of voltage application to the liquid crystal is large, whereas, in order to reduce the consumption of power, it is possible to select the second mode in which the number of times of voltage application to the liquid crystal is small.

A liquid crystal display device of a thirteenth aspect is the device of the twelfth aspect, wherein the first mode and the second mode are switched based on temperature. In the thirteenth aspect, the first mode and the second mode are switched based on temperature. Accordingly, it is possible to improve the brightness, especially, at low temperatures. The reason for this is that, by selecting the first mode at low temperatures, a decrease in the light transmittance caused by a decrease in the responsiveness of the liquid crystal at low temperatures can be limited by a plurality of times of voltage application to the liquid crystal.

In a liquid crystal display device of a fourteenth aspect, a ferroelectric liquid crystal material is used as the liquid crystal material. Therefore, in the case of a field-sequential type liquid crystal display device, it is possible to realize a high speed response of not more than 2 ms, which is necessary for display, and achieve a stable display, while, in the case of a color-filter type liquid crystal display device, it is possible to achieve high speed responsiveness. Besides, a liquid crystal display device of a fifteenth aspect performs a color display by a field-sequential method by switching the colors of light emitted by a light source in a time-divided manner in synchronism with on/off driving of the switching elements. By employing the field-sequential method, it is possible to realize a high-definition, high-speed response and high color purity display. Further, a liquid crystal display device of a sixteenth aspect performs a color display by selectively transmitting white light from a light source through color filters in a plurality of colors. It is possible to add the features of the liquid crystal having spontaneous polarization and achieve excellent responsiveness while utilizing the color-filter technique.

The above and further objects and features of the invention will more fully be apparent from the following detailed description with accompanying drawings.

BRIEF DESCRIPTION OF THE SEVERAL VIEWS OF THE DRAWINGS

FIGS. 5(a)-(d) show examples of a grayscale display by a liquid crystal display device of the present invention;

DETAILED DESCRIPTION OF THE INVENTION

The following description will specifically explain the present invention with reference to the drawings illustrating some embodiments thereof. Note that the present invention is not limited to the following embodiments.

First Embodiment

Figure 7:
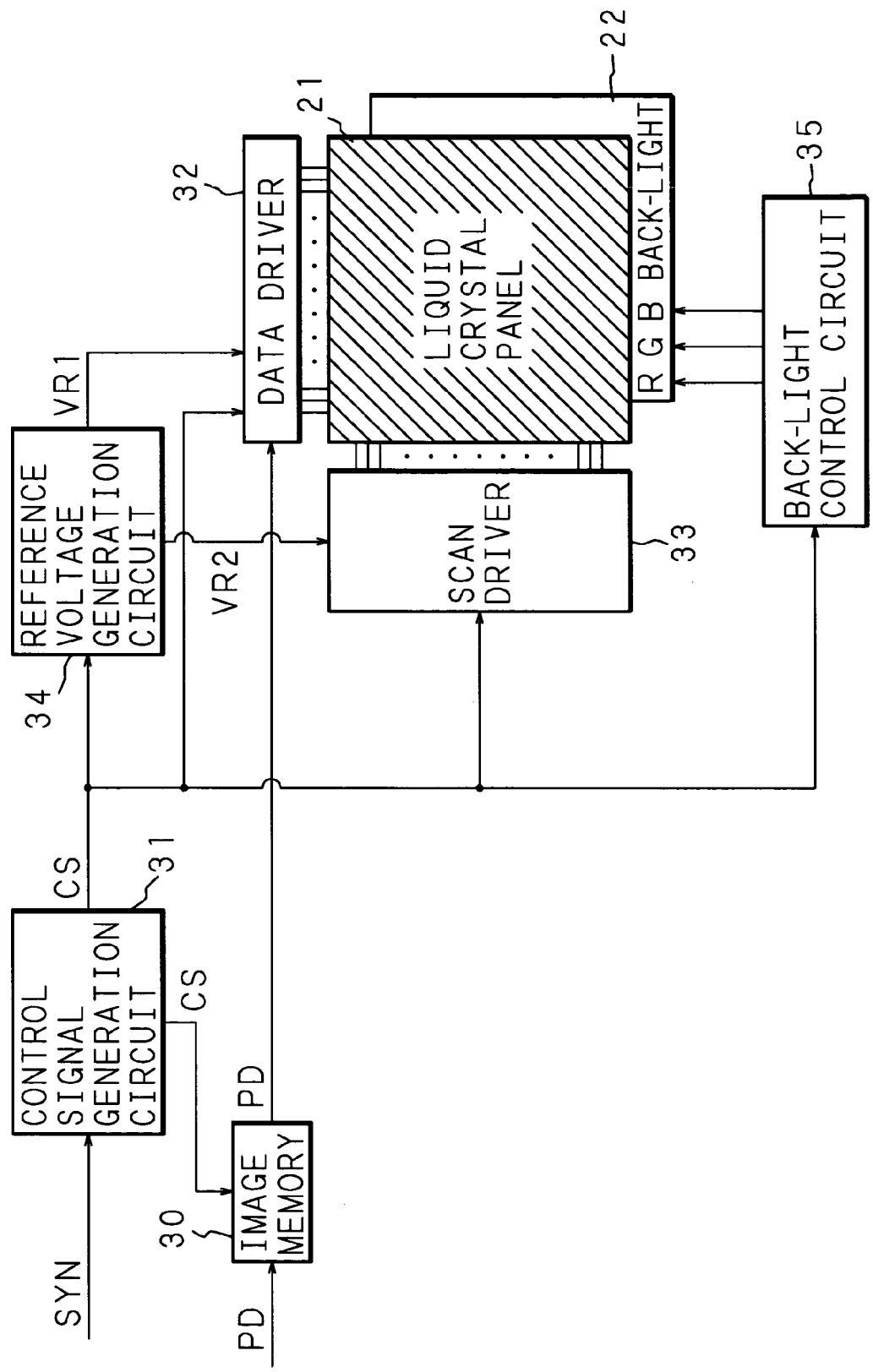
FIG. 7 is a block diagram showing the circuit structure of a liquid crystal display device (the first through fourth embodiments) of the present invention.
Figure 8:
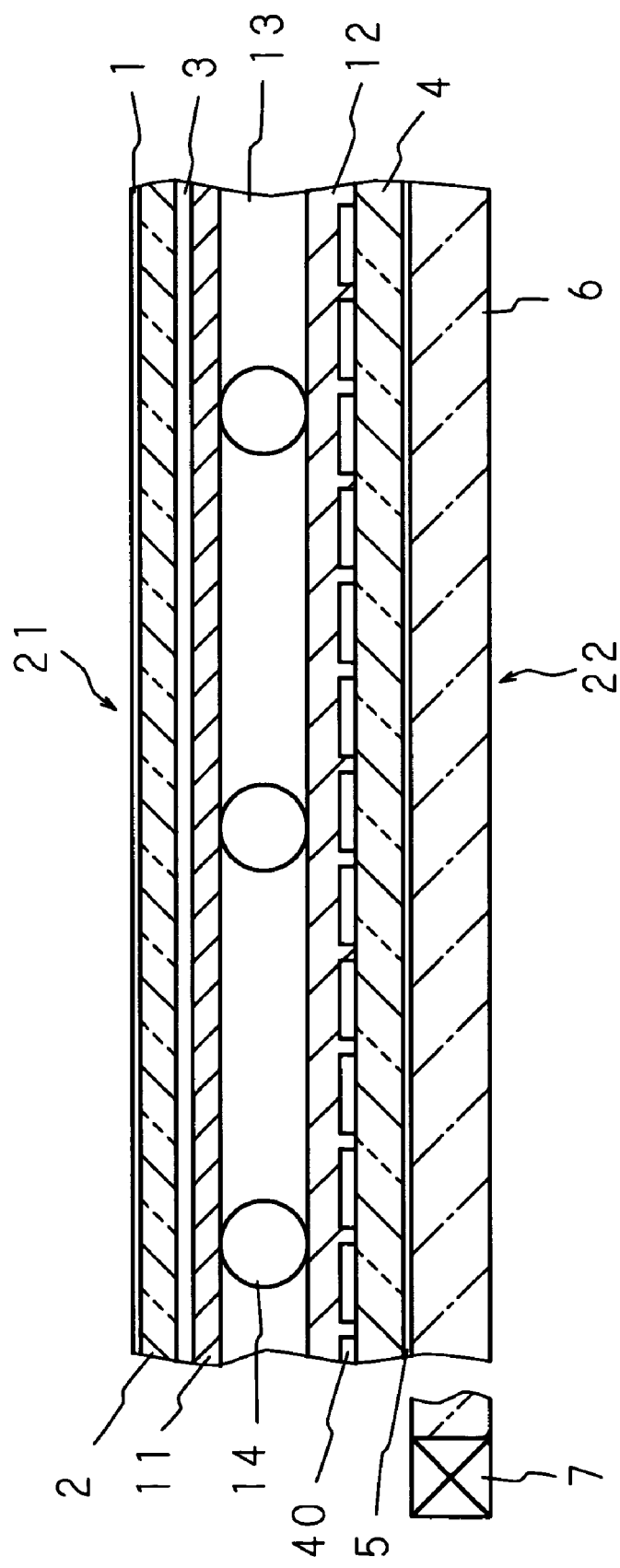
FIG. 8 is a schematic cross sectional view of a field-sequential type liquid crystal panel and back-light.
Figure 9:
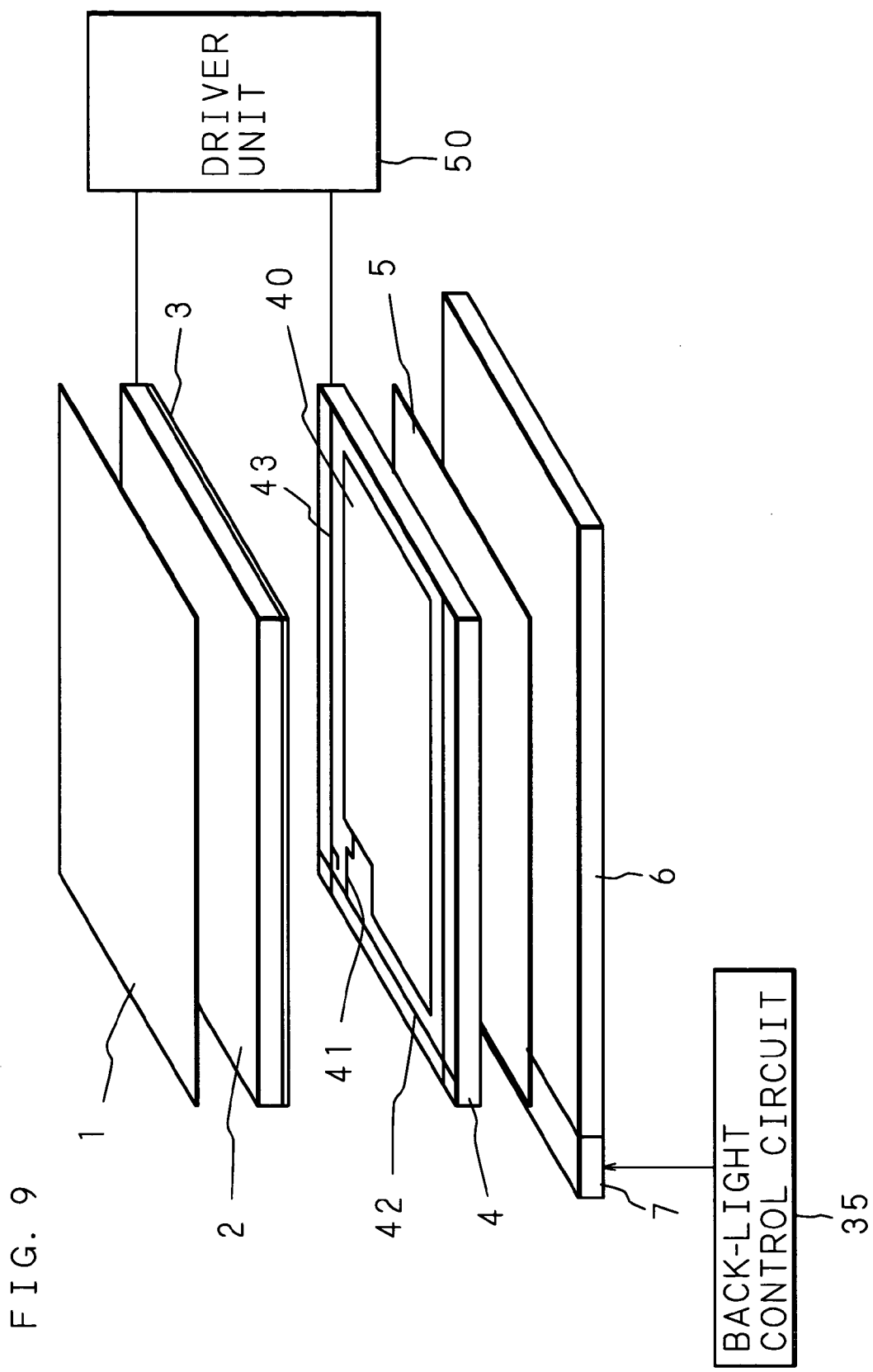
FIG. 9 is a schematic view showing an example of the overall structure of the liquid crystal display device.

FIG. 7 is a block diagram showing the circuit structure of a liquid crystal display device of the first embodiment; FIG. 8 is a schematic cross sectional view of a liquid crystal panel and a back-light; and FIG. 9 is a schematic view showing an example of the overall structure of the liquid crystal display device.

In FIG. 7, the numerals 21 and 22 represent a liquid crystal panel and a back-light whose cross sectional structures are shown in FIG. 8. As shown in FIG. 8, the back-light 22 is composed of an LED array 7 and a light guiding/diffusing plate 6. As shown in FIGS. 8 and 9, the liquid crystal panel 21 comprises a polarization film 1, a glass substrate 2, a common electrode 3, a glass substrate 4 and a polarization film 5, which are stacked in this order from the upper layer (front face) side to the lower layer (rear face) side, and pixel electrodes 40 which are arranged in matrix form on the common electrode 3 side of the glass substrate 4.

A driver unit 50 comprising a data driver 32 and a scan driver 33 is connected between the common electrode 3 and the pixel electrodes 40. The data driver 32 is connected to TFTs 41 through signal lines 42, while the scan driver 33 is connected to the TFTs 41 through scanning lines 43. The TFTs 41 are controlled to be on/off by the scan driver 33. Moreover, each of the pixel electrodes 40 is connected to the TFT 41. Therefore, the intensity of transmitted light of each individual pixel is controlled by a signal given from the data driver 32 through the signal line 42 and the TFT 41. Note that the date driver 32 is an 8-bit data driver, and can output 256 grayscales.

An alignment film 12 is provided on the upper face of the pixel electrodes 40 on the glass substrate 4, while an alignment film 11 is placed on the lower face of the common electrode 3. The space between these alignment films 11 and 12 is filled with a liquid crystal material so as to form a liquid crystal layer 13. Note that the numeral 14 represents spacers for maintaining a layer thickness of the liquid crystal layer 13.

The back-light 22 is disposed on the lower layer (rear face) side of the liquid crystal panel 21, and has the LED array 7 placed to face an end face of the light guiding/diffusing plate 6 that forms a light emitting area. This LED array 7 comprises 10 LEDs, one LED chip being composed of LED elements that emit light of the three primary colors, namely red (R), green (G) and blue (B), on a face facing the light guiding/diffusing plate 6. The LED array 7 turns on the red, green and blue LED elements in red, green and blue sub-frames, respectively. The light guiding/diffusing plate 6 guides the light emitted from each LED of this LED array 7 to its entire surface and diffuses the light to the upper face, thereby functioning as the light emitting area.

This liquid crystal panel 21 and the back-light 22 capable of emitting red, green and blue light in a time-divided manner are stacked one upon another. The ON timing and the color of emitted light of the back-light 22 are controlled in synchronism with image data writing scanning/erasing scanning of the liquid crystal panel 21.

In FIG. 7, the numeral 31 is a control signal generation circuit to which a synchronous signal SYN is inputted from a personal computer, and which generates various control signals CS necessary for display. Pixel data PD is outputted from an image memory 30 to the data driver 32. Based on the pixel data PD and a control signal CS for changing the polarity of applied voltage, voltages which are different in polarity and substantially equal in magnitude are applied to the liquid crystal panel 21 through the data driver 32 when performing data writing scanning and data erasing scanning, respectively.

Moreover, the control signal generation circuit 31 outputs a control signal CS to each of a reference voltage generation circuit 34, the data driver 32, the scan driver 33, and a back-light control circuit 35. The reference voltage generation circuit 34 generates reference voltages VR1 and VR2, and outputs the generated reference voltages VR1 and VR2 to the data driver 32 and the scan driver 33, respectively. The data driver 32 outputs signals to the signal lines 42 of the pixel electrodes 40 based on the pixel data PD from the image memory 30 and the control signals CS from the control signal generation circuit 31. In synchronism with the output of the signals, the scan driver 33 scans the scanning lines 43 of the pixel electrodes 40 sequentially on a line by line basis. Further, the back-light control circuit 35 applies a drive voltage to the back-light 22 so as to emit red light, green light, and blue light from the back-light 22.

Next, the operation of the liquid crystal display device of the present invention will be explained. To the image memory 30, pixel data PD for display is supplied from the personal computer. After storing the pixel data PD temporarily, the image memory 30 outputs the pixel data PD upon receipt of the control signal CS outputted from the control signal generation circuit 31. The control signal CS generated by the control signal generation circuit 31 is supplied to the data driver 32, scan driver 33, reference voltage generation circuit 34, and back-light control circuit 35. The reference voltage generation circuit 34 generates reference voltages VR1 and VR2 upon receipt of the control signal CS, and outputs the generated reference voltages VR1 and VR2 to the data driver 32 and the scan driver 33, respectively.

When the data driver 32 receives the control signal CS, it outputs a signal to the signal lines 42 of the pixel electrodes 40, based on the pixel data PD outputted from the image memory 30. When the scan driver 33 receives the control signal CS, it scans the scanning lines 43 of the pixel electrodes 40 sequentially on a line by line basis. According to the output of the signal from the data driver 32 and the scanning by the scan driver 33, the TFTs 41 are driven and a voltage is applied to the pixel electrodes 40, thereby controlling the intensity of the transmitted light of the pixels.

When the back-light control circuit 35 receives the control signal CS, it applies a drive voltage to the back-light 22 so as to cause the red, green and blue LED elements of the LED array 7 of the back-light 22 to emit light in a time-divided manner, thereby emitting red light, green light, and blue light sequentially with passage of time.

Concrete examples are illustrated below. After washing a TFT substrate having pixel electrodes 40 (pixel number: 640×480, electrode area: $6\times10^{-5}$ cm$^2$, diagonal: 3.2 inches) and a glass substrate 2 having a common electrode 3, they were coated with polyimide and baked for one hour at 200° C. so as to form about 200 Å thick polyimide films as alignment films 11 and 12. Further, these alignment films 11 and 12 were rubbed with a rayon fabric, and an empty panel was produced by stacking these two substrates so that the rubbing directions are parallel and maintaining a gap therebetween by spacers 14 made of silica having an average particle size of 1.6 μm. A ferroelectric liquid crystal material composed mainly of naphthalene-based liquid crystal and showing a bistable electro-optic response was sealed between the alignment films 11 and 12 of this empty panel so as to form a liquid crystal layer 13. The magnitude of spontaneous polarization of the sealed ferroelectric liquid crystal material was 8 nC/cm$^2$, and the tilt angle was 20°.

The liquid crystal panel 21 was produced by sandwiching the fabricated panel by two polarization films 1 and 5 arranged in a crossed-Nicol state, and the average molecular axis of the liquid crystal molecular director in the absence of applied voltage was substantially aligned with the polarization axis of one of the polarization films to provide a dark state.

Figure 10:
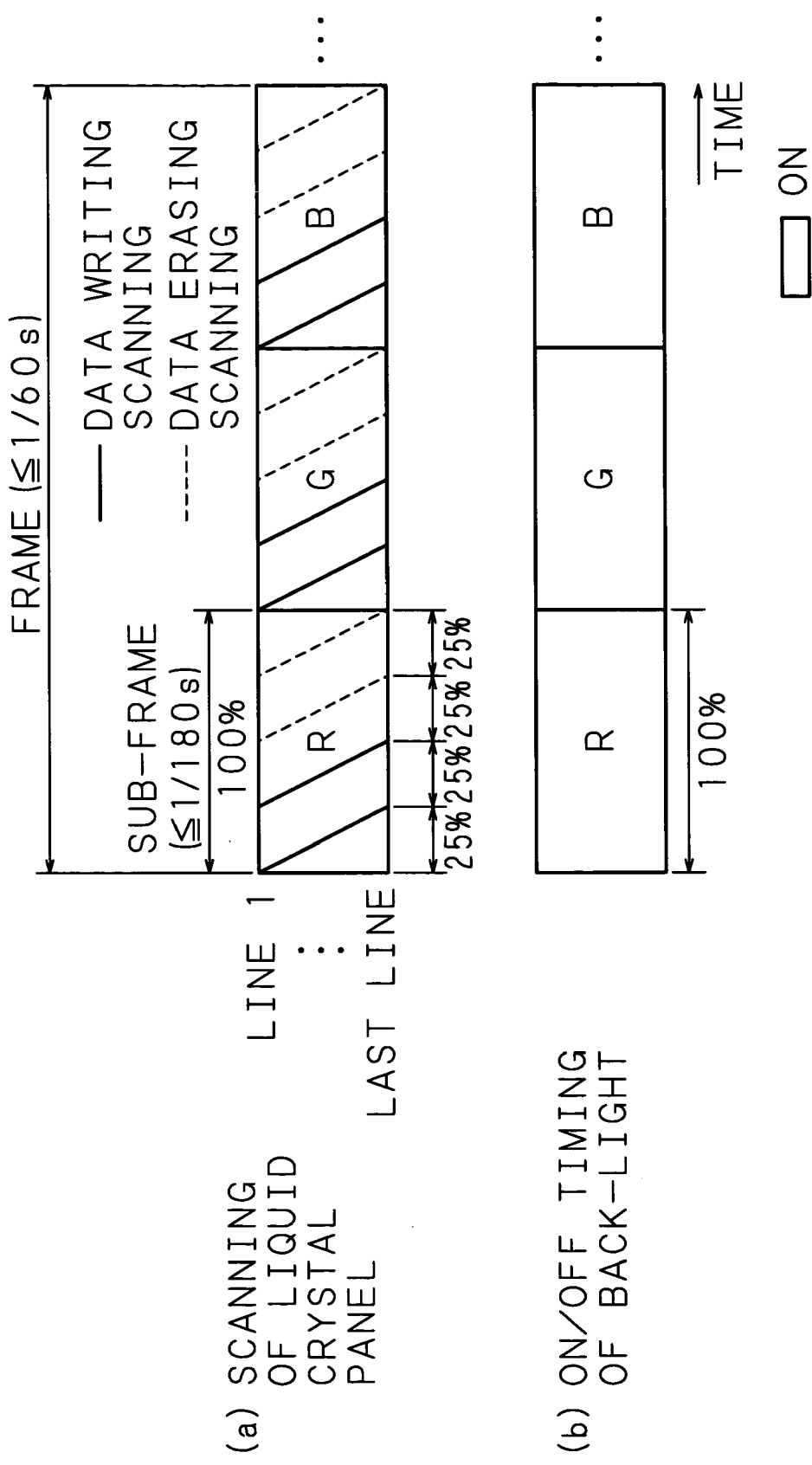
FIGS. 10(a) and (b) are time charts showing display control in a liquid crystal display device (the first embodiment) of the present invention.

The liquid crystal panel 21 thus fabricated and the above-described back-light 22 comprising the LED array 7 capable switching surface emission of monochrome colors, red, green and blue, as a light source were stacked one upon another, and a color display was performed by a field-sequential method, according to a drive sequence as shown in FIG. 10.

FIG. 10 shows a time chart of display control according to the first embodiment, wherein FIG. 10(a) shows the scanning timing of each line of the liquid crystal panel 21 and FIG. 10(b) shows the ON/OFF timing of red, green and blue colors of the back-light 22. One frame is divided into three sub-frames, and, for example, writing/erasing scanning of red image data is performed by turning on the red LED element in the first sub-frame within one frame, writing/erasing scanning of green image data is performed by turning on the green LED element in the next second sub-frame, and writing/erasing scanning of blue image data is performed by turning on the blue LED element in the last third sub-frame.

In each sub-frame, the data writing scanning is performed twice continuously, and then the data erasing scanning is performed twice continuously. The time required for one data writing scanning and that for one data erasing scanning are each 25% of the sub-frame. The applied voltages in the two data writing scanning operations are equal in magnitude, and the applied voltages in the two data erasing scanning operations are equal in magnitude. The applied voltage in the data writing scanning and the applied voltage in the data erasing scanning are substantially equal in magnitude, but opposite in polarity. Note that the back-light 22 is turned on at all times.

Figure 11:
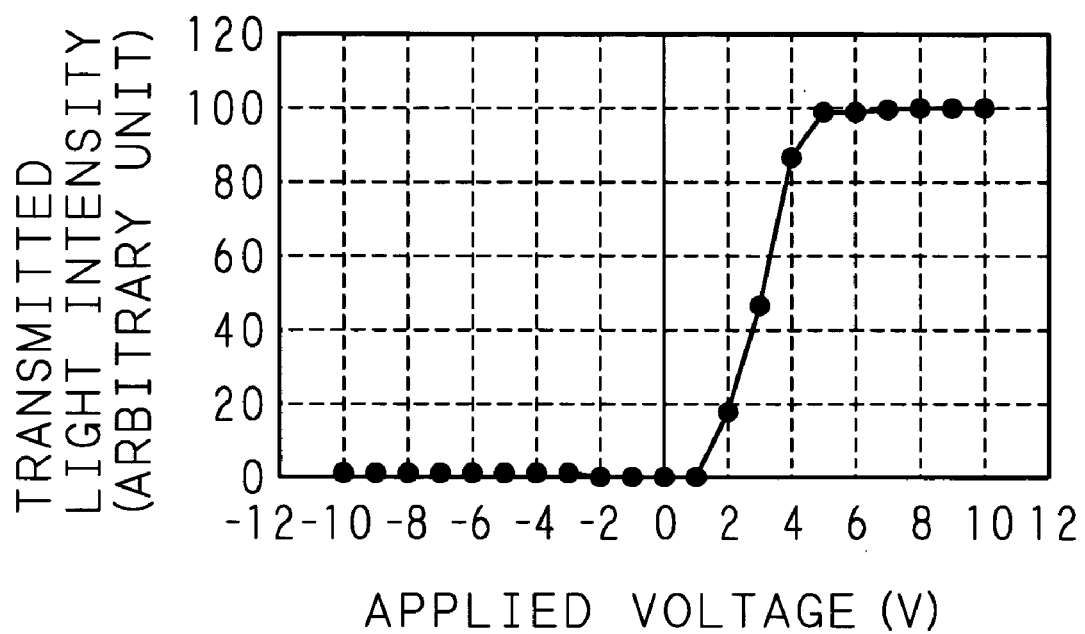
FIG. 11 is a graph showing the applied voltage-transmitted light intensity characteristics of the liquid crystal display device of the present invention.

FIG. 11 is a graph showing the applied voltage-transmitted light intensity characteristics, and the light transmittance is saturated at the applied voltage of about 5 V. Besides, the power consumed by the back-light 22 is 1.9 W.

Second Embodiment

The following description will explain the second embodiment in which the back-light 22 is temporarily turned off. Since the circuit structure and operation of the liquid crystal display device and the structure of the liquid crystal panel 21 are the same as those in the first embodiment, the explanation thereof is omitted.

Figure 12:
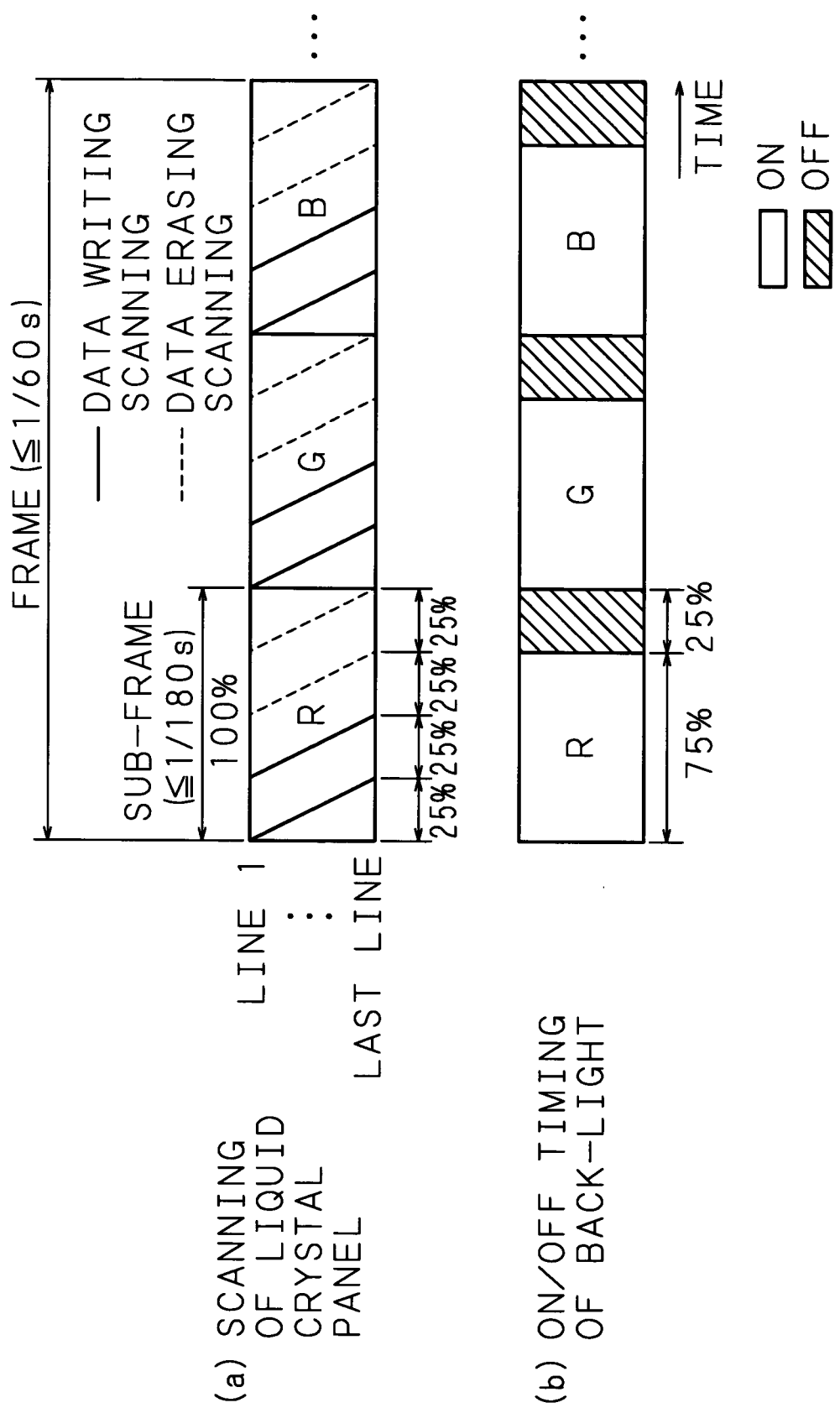
FIGS. 12(a) and (b) are time charts showing display control in a liquid crystal display device (the second through fifth embodiments) of the present invention.

FIG. 12 shows a time chart of display control according to the second embodiment, wherein FIG. 12(a) shows the scanning timing of each line of the liquid crystal panel 21 and FIG. 12(b) shows the ON/OFF timing of red, green and blue colors of the back-light 22.

In each sub-frame, similarly to the first embodiment, the data writing scanning is performed twice continuously with the same applied voltage value, and then the data erasing scanning is performed twice continuously with the same applied voltage value. Note that, similarly to the first embodiment, the applied voltage in the data writing scanning and the applied voltage in the data erasing scanning are substantially equal in magnitude, but opposite in polarity.

Unlike the first embodiment in which the back-light 22 is turned on at all times, in the second embodiment, the back-light 22 is turned on in synchronism with the start timing of the first data writing scanning, and the back-light 22 is turned off in synchronism with the end timing of the first data erasing scanning.

As a result of examining the applied voltage-transmitted light intensity characteristics, characteristics similar to those of the first embodiment are obtained (see FIG. 11), and the light transmittance is saturated at the applied voltage of about 5 V. Besides, the power consumed by the back-light 22 is 1.4 W which is lower than that in the first embodiment.

COMPARATIVE EXAMPLE

Figure 1:
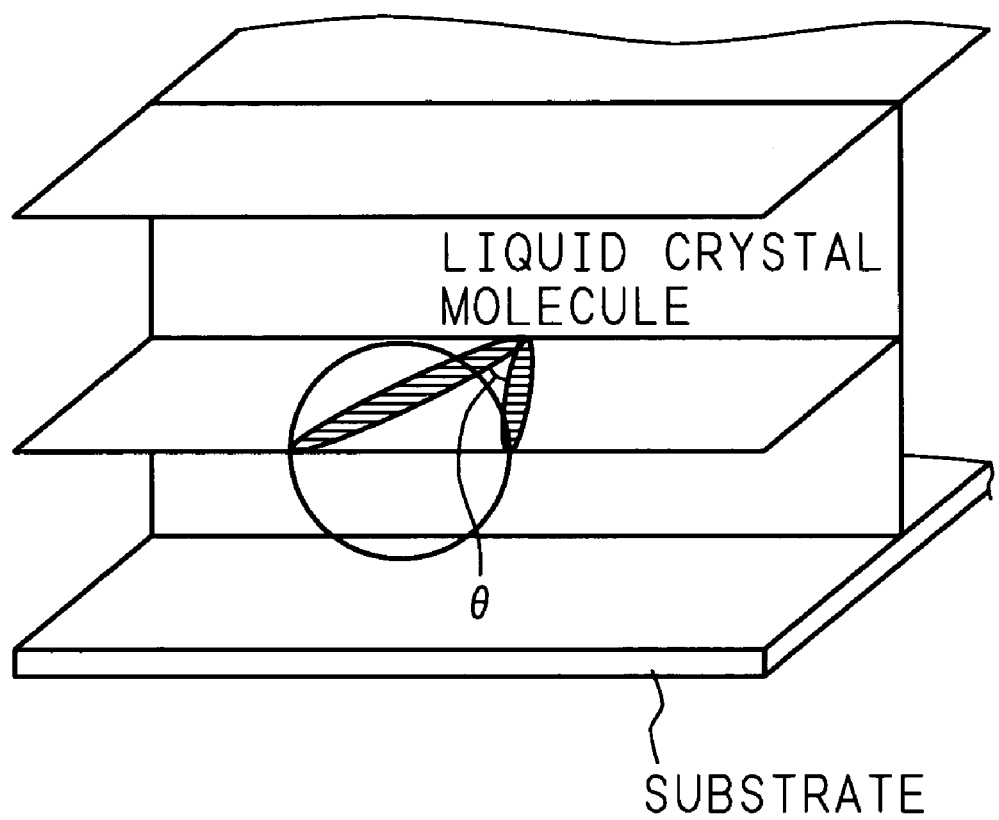
FIG. 1 is an illustration showing an alignment state of a liquid crystal molecule in a ferroelectric liquid crystal panel.
Figure 2:
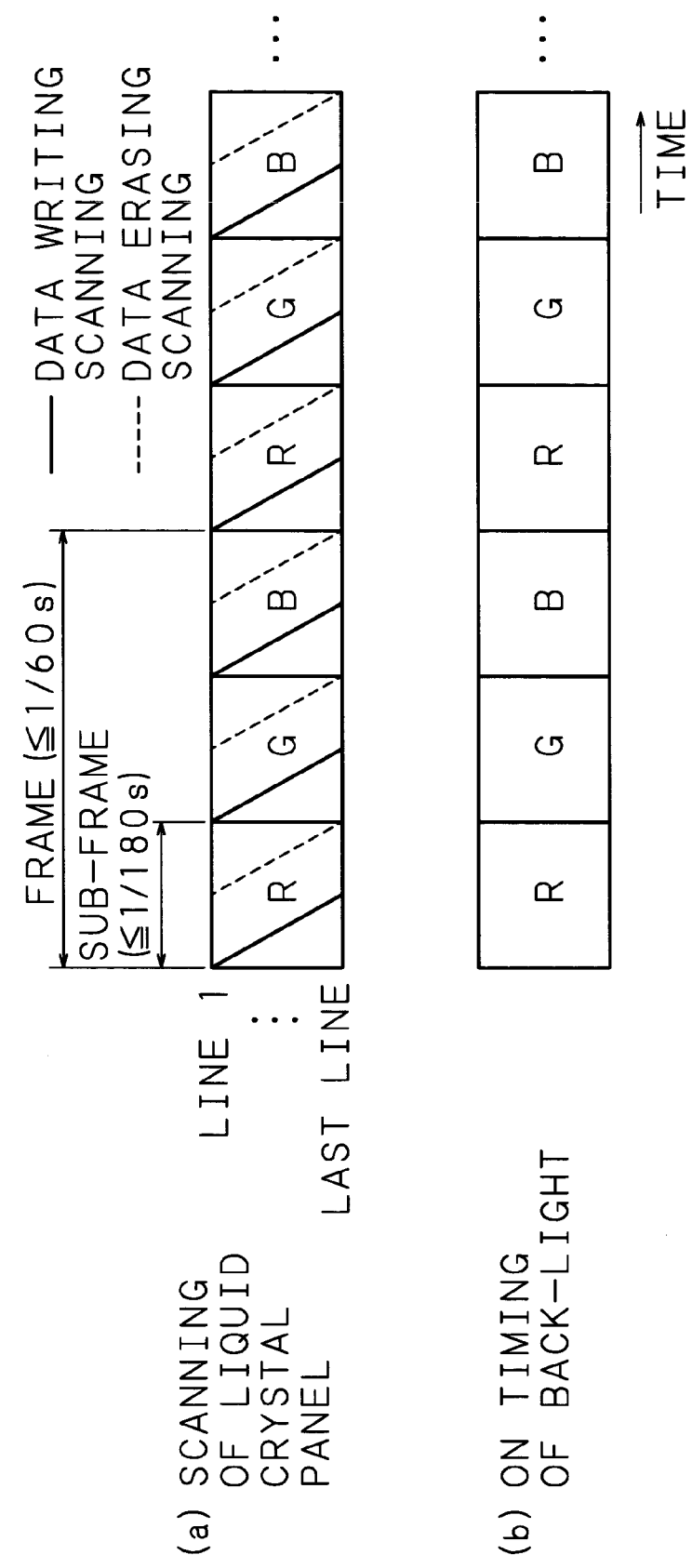
FIGS. 2(a) and (b) are time charts showing display control in a conventional liquid crystal display device.
Figure 3:
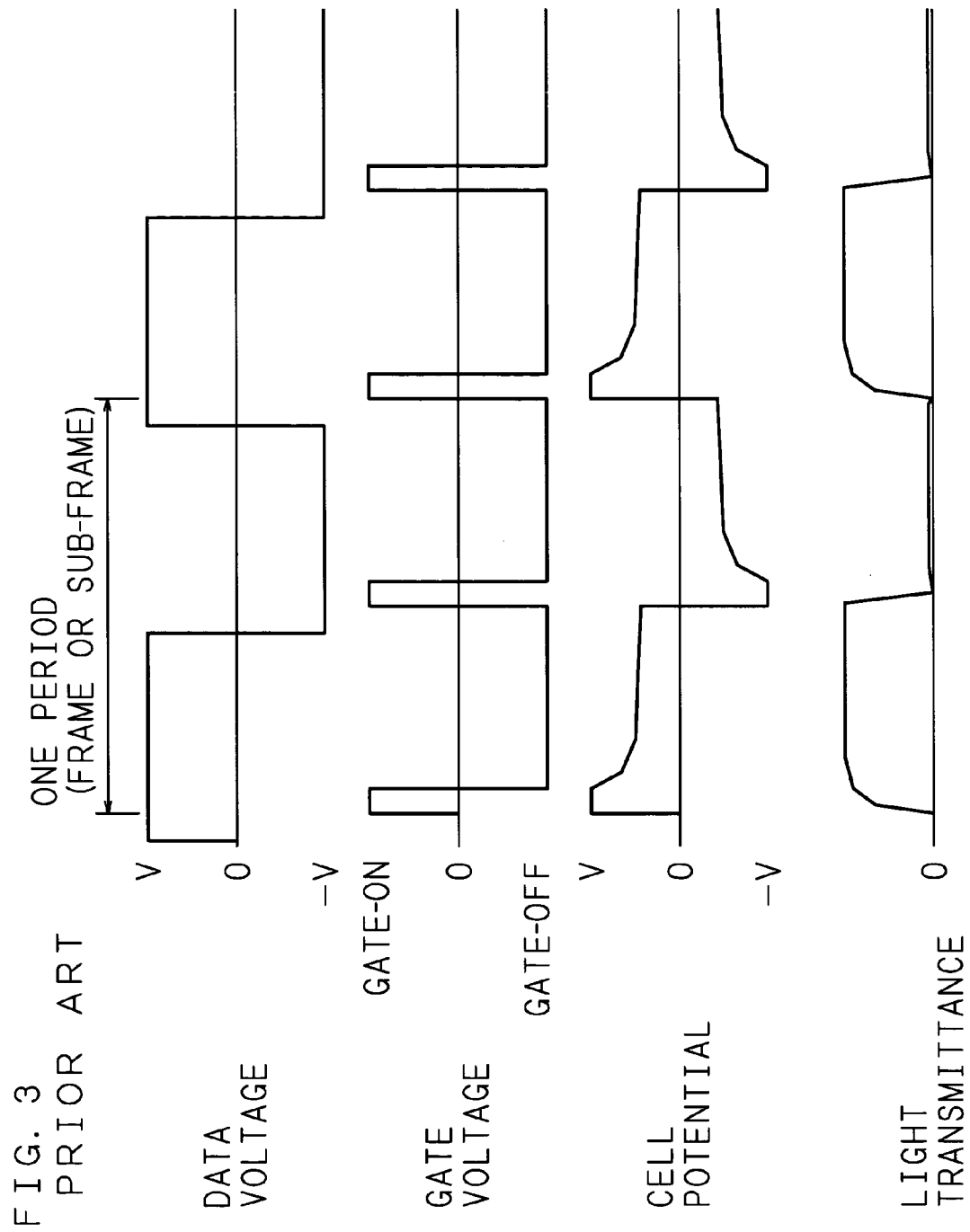
FIG. 3 is an explanatory view of the cell potential and the light transmittance of a conventional ferroelectric liquid crystal.
Figure 4:
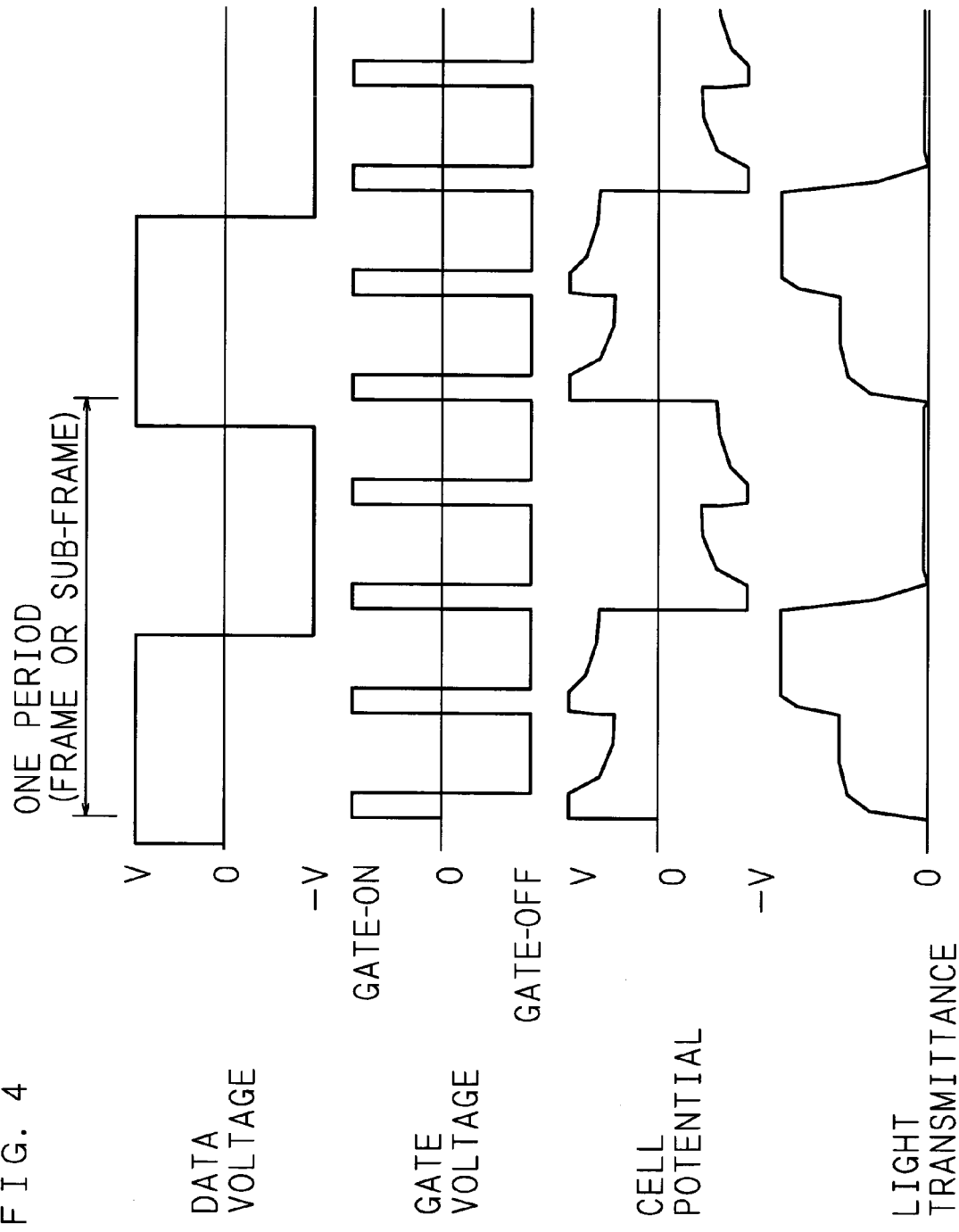
FIG. 4 is an explanatory view of the cell potential and the light transmittance of a ferroelectric liquid crystal of the present invention.
Figure 6A:
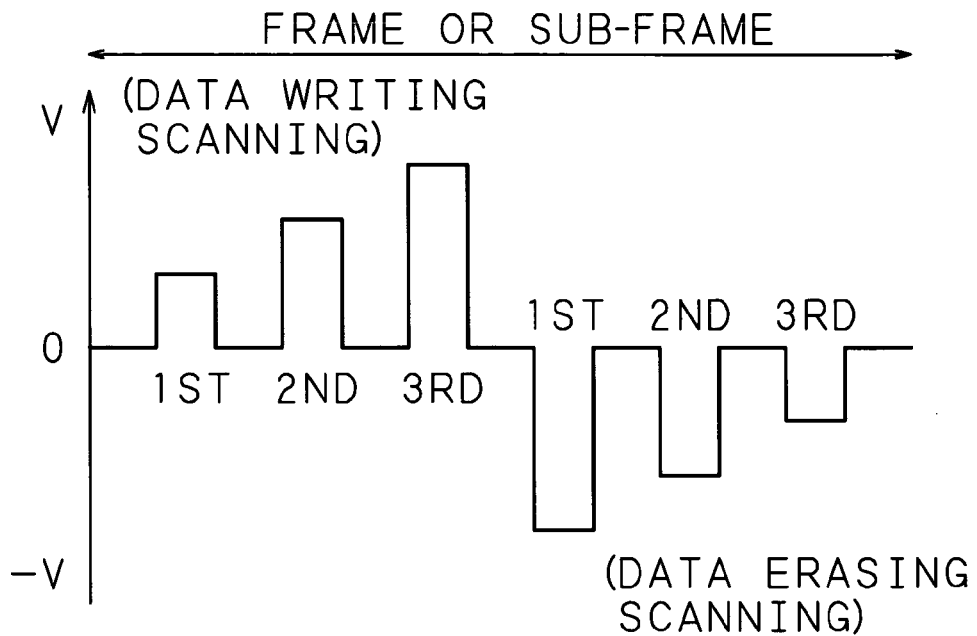
FIG. 6A shows a pattern of voltage application in a liquid crystal display device of the present invention.
Figure 6B:
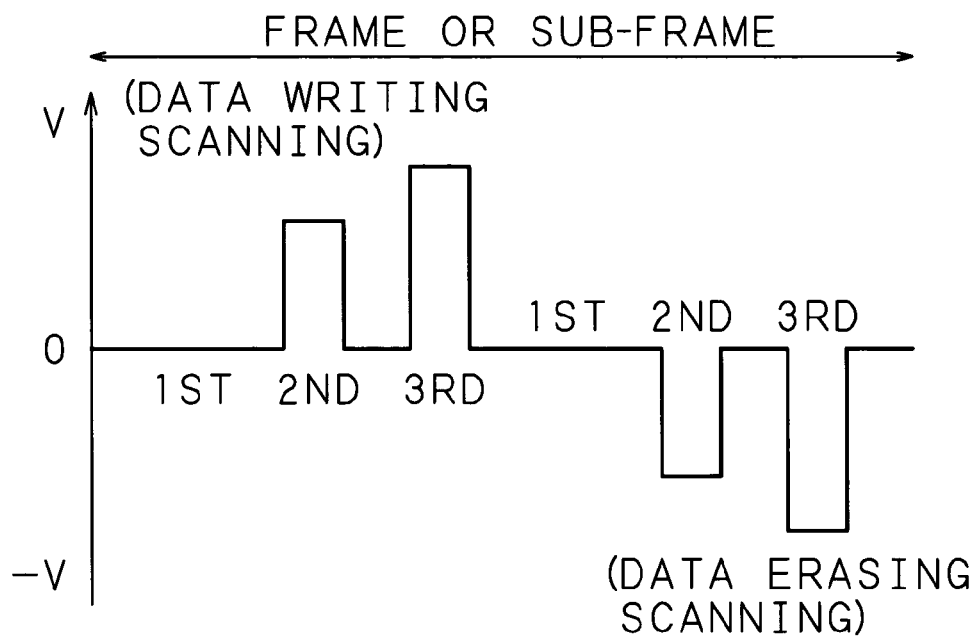
FIG. 6B shows a pattern of voltage application as a reference example.

With the use of a liquid crystal panel and a back-light similar to those in the first and second embodiments, a color display is performed according to a conventional driving sequence as shown in FIG. 2 (in each sub-frame, data writing scanning is performed once and data erasing scanning is performed once).

Figure 13:
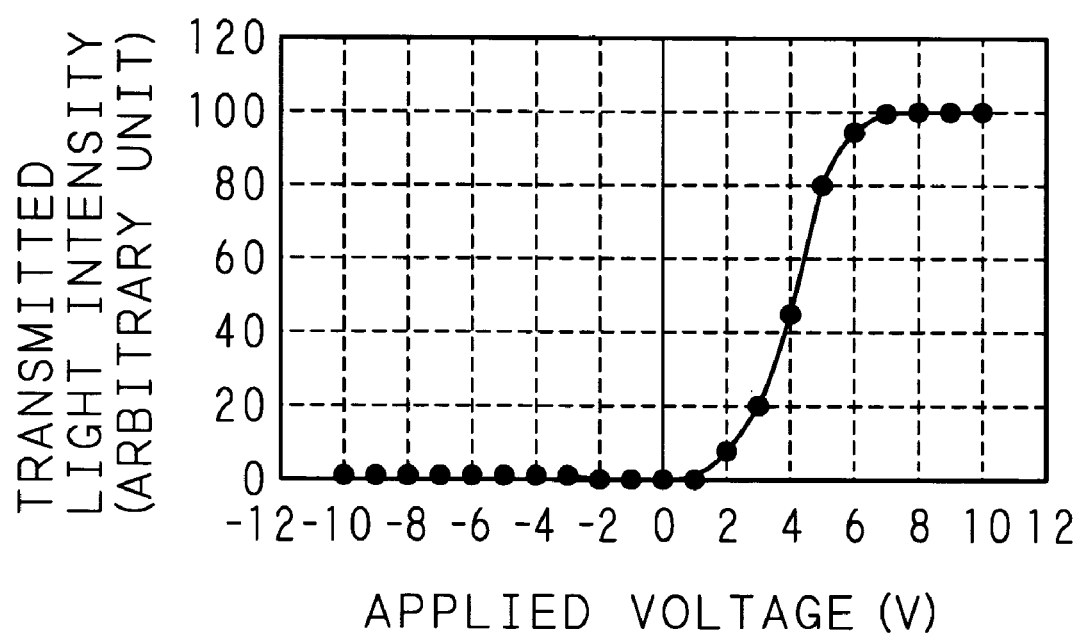
FIG. 13 is a graph showing the applied voltage-transmitted light intensity characteristics of a conventional liquid crystal display device.

FIG. 13 is a graph showing the applied voltage-transmitted light intensity characteristics, and the light transmittance is saturated at a high applied voltage of about 7 V. Besides, the power consumed by the back-light 22 is 1.9 W.

Third Embodiment

The following description will explain the third embodiment in which the magnitude of applied voltage in each of the data writing scanning and the data erasing scanning is varied. Since the circuit structure and operation of the liquid crystal display device are the same as those in the first embodiment, the explanation thereof is omitted.

First, in the exactly same manner as in the first embodiment, an empty panel was fabricated.

A ferroelectric liquid crystal material showing the phase sequence of isotropic phase—cholesteric phase—chiral smectic C phase from the higher temperature side and a monostable electro-optic response was sealed between the alignment films 11 and 12 of this empty panel to form a liquid crystal layer 13, and an alignment process was performed by applying a DC voltage of 10 V to the liquid crystal layer 13 in a temperature range of ±3° C. from the transition temperature to the chiral smectic C phase from the cholesteric phase (100 to 94° C.). In the alignment process, the liquid crystal was heated to the isotropic phase (120° C.) once, and then cooled down to room temperature (25° C.) by fixing the cooling rate at −1° C./minute. With this alignment process, uniform liquid crystal alignment was obtained. The magnitude of spontaneous polarization of the sealed liquid crystal material was 11 nC/cm$^2$, and the maximum value of an angle formed by an average molecular axis of a liquid crystal molecular director in the absence of applied voltage and an average molecular axis of a liquid crystal molecular director in the presence of applied voltage was 42°. A liquid crystal panel 21 was produced by sandwiching the fabricated panel by two polarization films 1 and 5 arranged in a crossed-Nicol state, and the average molecular axis of liquid crystal molecular director in the absence of applied voltage was substantially aligned with the polarization axis of one of the polarization films to provide a dark state.

The liquid crystal panel 21 thus fabricated and the above-described back-light 22 comprising the LED array 7 capable of switching surface emission of monochrome colors, red, green and blue, as a light source were stacked one upon another, and a color display was performed by a field-sequential method, according to a drive sequence as shown in FIG. 12.

In each sub-frame, the data writing scanning is performed twice continuously, and then the data erasing scanning is performed twice continuously. The two applied voltages in each of the data writing scanning and the data erasing scanning are not necessarily equal in magnitude, and the applied voltage value in the second scanning is made larger than the applied voltage value in the first scanning. Besides, the applied voltages to each pixel in the data writing scanning and the data erasing scanning are substantially equal in magnitude, but opposite in polarity.

Similarly to the second embodiment, in each sub-frame, the back-light 22 is turned on in synchronism with the start timing of the first data writing scanning, and turned off in synchronism with the end timing of the first data erasing scanning.

Figure 14:
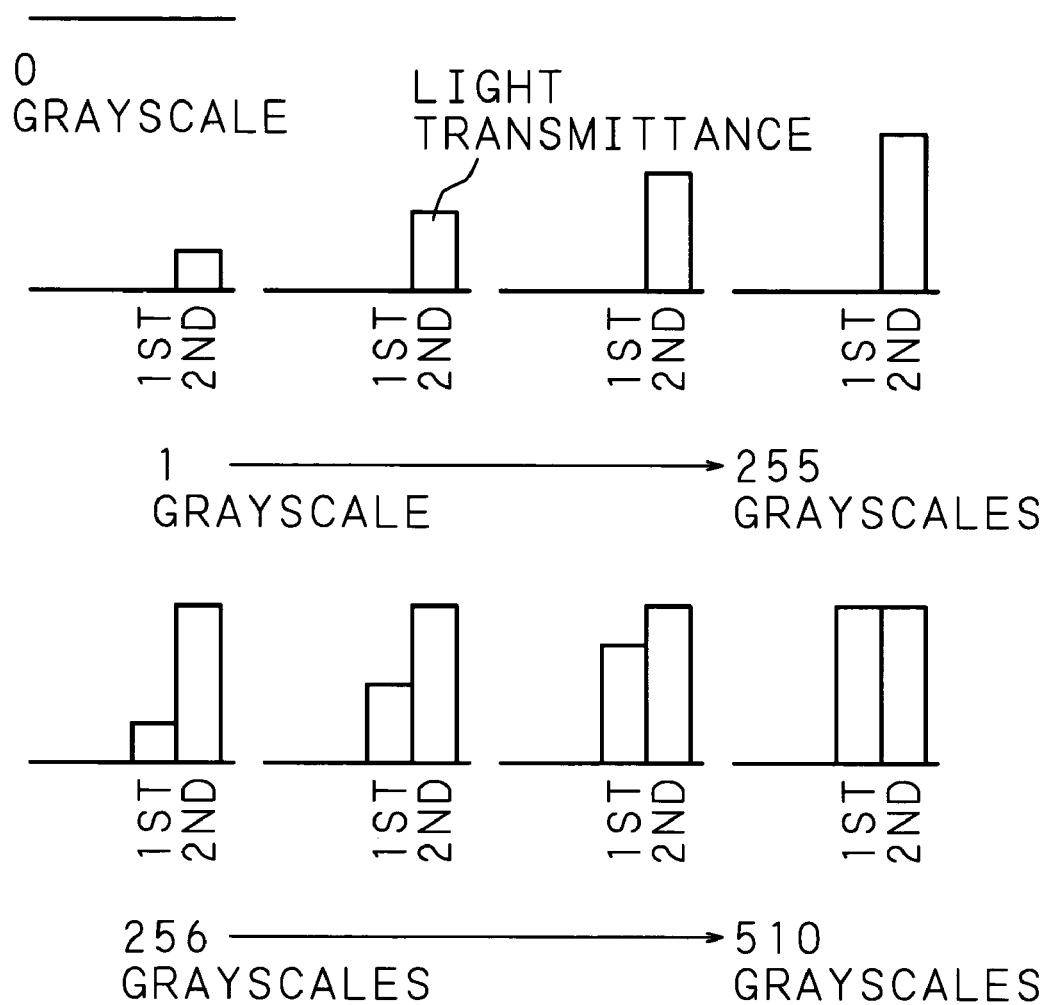
FIG. 14 shows an example of a grayscale display by a liquid crystal display device (the third and fourth embodiments) of the present invention.

FIG. 14 shows an example of a grayscale display in which the number (N) of times of writing is two times and the number (M) of driver's output grayscales is 256. In each sub-frame, lower grayscale levels (0 to 255 grayscales) are displayed by the second voltage application (data writing scanning), and higher (brighter) grayscale levels (256 to 510 grayscales) than the display of grayscales by the second voltage application (data writing scanning) are displayed by a combination of the first voltage application and the second voltage application (data writing scanning).

Note that, as is clear from FIG. 14, when the light transmittance in the first scanning is not substantially 0, the applied voltage is adjusted so that the light transmittance in the second scanning becomes substantially maximum. In short, the applied voltage in the second scanning is the applicable maximum voltage (saturation voltage).

Accordingly, it is possible to display 0 to 510 grayscales (the number of grayscales is 511) greater than 0 to 255 grayscales (the number of grayscales is 256) of the output grayscales of the data driver 32 for each color, and achieve a high quality display.

Fourth Embodiment

The following description will explain the fourth embodiment in which the magnitude of applied voltage is varied in each data writing scanning and data erasing scanning. Since the circuit structure and operation of the liquid crystal display device are the same as those in the first embodiment and the structure of the liquid crystal panel 21 is the same as that in the third embodiment, the explanation thereof is omitted.

Similarly to the third embodiment, a color display is performed by a field-sequential method, according to a drive sequence as shown in FIG. 12. In each sub-frame, the data writing scanning is performed twice continuously, and then the data erasing scanning is performed twice continuously. The two applied voltages in each of the data writing scanning and the two data erasing scanning operations are not necessarily equal in magnitude, and the applied voltage value in the second scanning is made larger than a cell voltage value just before the second scanning. Besides, the applied voltages to each pixel in the data writing scanning and the data erasing scanning are substantially equal in magnitude, but opposite in polarity.

Similarly to the second embodiment, in each sub-frame, the back-light 22 is turned on in synchronism with the start timing of the first data writing scanning, and turned off in synchronism with the end timing of the first data erasing scanning.

Similarly to the third embodiment, as shown in FIG. 14, lower grayscale levels (0 to 255 grayscales) are displayed by the second voltage application (data writing scanning), and higher (brighter) grayscale levels (256 to 510 grayscales) than the display of grayscales by the second voltage application (data writing scanning) are displayed by a combination of the first voltage application and the second voltage application (data writing scanning). When the light transmittance in the first scanning is not substantially 0, the applied voltage is adjusted so that the light transmittance in the second scanning becomes substantially maximum.

Accordingly, it is possible to display 0 to 510 grayscales (the number of grayscales is 511) greater than 0 to 255 grayscales (the number of grayscales is 256) of the output grayscales of the data driver 32 for each color, and achieve a high quality display.

Fifth Embodiment

The following description will explain the fifth embodiment in which the number of times of voltage application (data writing scanning/erasing scanning) is selectable, based on ambient temperature, in each sub-frame.

Figure 15:
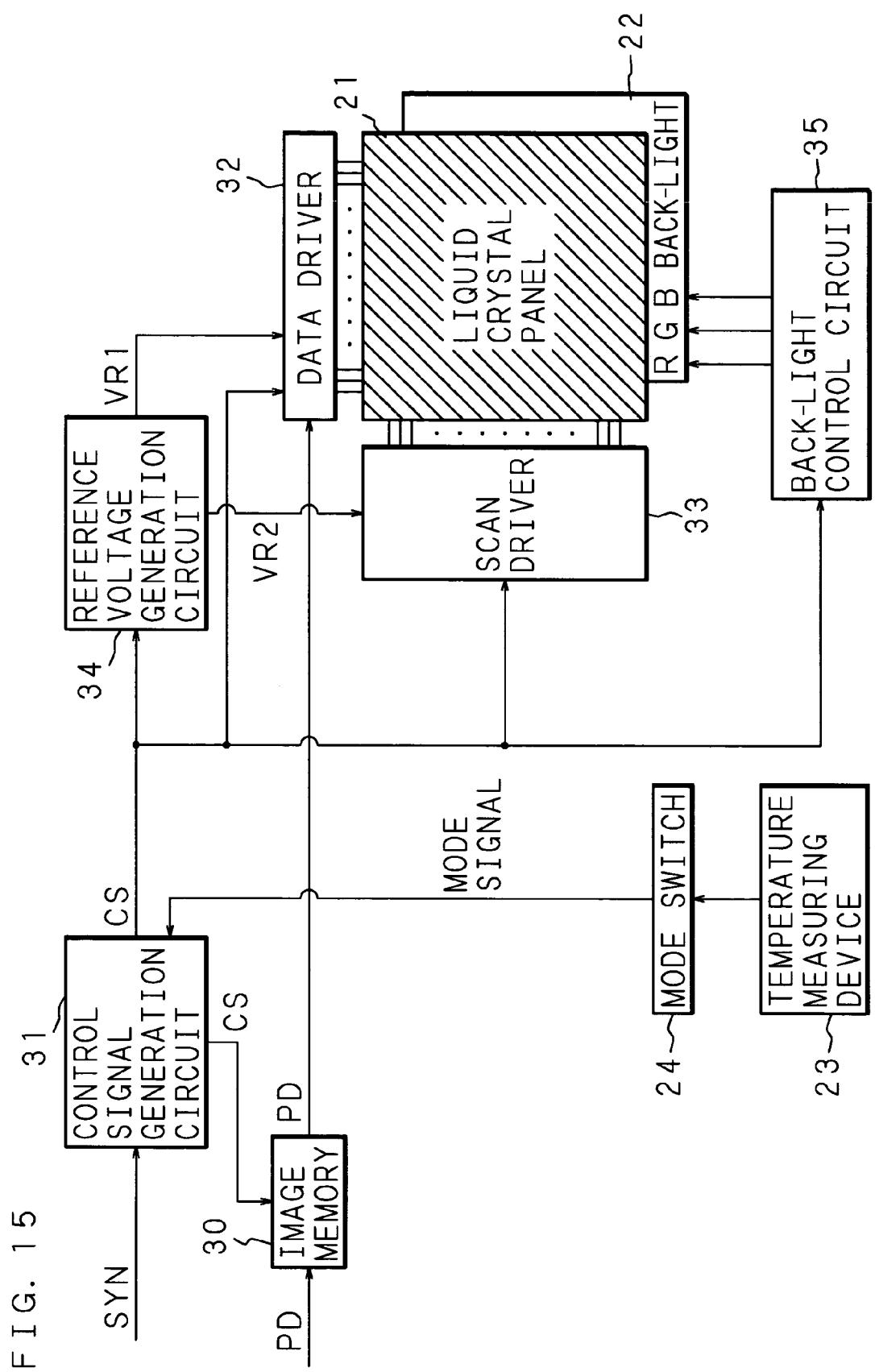
FIG. 15 is a block diagram showing the circuit structure of a liquid crystal display device (the fifth embodiment) of the present invention.

FIG. 15 is a block diagram showing the circuit structure of a liquid crystal display device of the fifth embodiment. In FIG. 15, the members same as, or similar to, the members shown in FIG. 7 are designated with the same numeric numbers. Note that the liquid crystal panel, including the liquid crystal material used, of the fifth embodiment is the same as those of the third and fourth embodiments.

In FIG. 15, the numeral 23 is a temperature measuring device for measuring the temperature of the liquid crystal panel 21, and 24 is a mode switch for switching to either a first mode in which voltage of the same polarity is applied through the TFT 41 twice in each sub-frame, or a second mode in which voltage of the same polarity is applied through the TFT 41 only once in each sub-frame. The mode switch 24 outputs a mode signal indicating the type of the switched mode to the control signal generation circuit 31. According to this mode signal, the control signal generation circuit 31 sets a control signal CS to be generated.

In the fifth embodiment, the drive sequences are switched between a drive sequence (first mode) shown in FIG. 12 in which the data writing scanning is performed twice continuously and then the data erasing scanning is performed twice continuously in each sub-frame and a drive sequence (second mode) shown in FIG. 2 in which the data writing scanning is performed once and the data erasing scanning is performed once in each sub-frame. When the measurement result of the temperature measuring device 23 is lower than 0° C., the first mode is selected, whereas when the measurement result is not lower than 0° C., the second mode is selected.

Note that the magnitudes of the applied voltages in the two data writing scanning operations are equal, and the magnitudes of the applied voltages in the two data erasing scanning operations are equal. Further, the applied voltage in the data writing scanning and the applied voltage in the data erasing scanning are substantially equal in magnitude, but opposite in polarity. Besides, similarly to the second embodiment, the back-light 22 is turned on only in a period from the start timing of the first data writing scanning to the end timing of the first data erasing scanning.

In the case where the data writing scanning is performed once and the data erasing scanning is performed once in each sub-frame without switching the drive sequence (in the case of the drive sequence of FIG. 2), when the temperature of the liquid crystal panel 21 becomes lower than 0° C., it is impossible to achieve a display with sufficient brightness due to a decrease in the responsiveness of liquid crystal. Whereas in the fifth embodiment in which the drive sequence is switched based on the temperature of the liquid crystal panel 21, when the temperature of the liquid crystal panel 21 becomes lower than 0° C., the data writing scanning is performed twice and the data erasing scanning is performed twice in each sub-frame according to the drive sequence as shown in FIG. 12 (the first mode), and consequently it is possible to achieve a display with sufficient brightness even at −5° C.

By the way, the power consumption for the scanning of the liquid crystal panel 21 is larger in the first mode than in the second mode. Therefore, in the fifth embodiment in which the second mode which consumes less power is selected in the ambient temperature range (not less than 0° C.) in which the influence of the decrease in the responsiveness of liquid crystal is small and the mode is switched to the first mode in a low temperature environment where the decrease in the responsiveness of liquid crystal is noticeable, it is possible to ensure lower power consumption than in the case where the first mode is always employed. On the other hand, as described above, it is possible to improve the brightness in the low temperature environment. Thus, in the fifth embodiment, it is possible to realize both of low power consumption in the ambient temperature range and good display characteristics in the low temperature range.

Sixth Embodiment

The following description will explain the sixth embodiment in which the present invention is applied to a liquid crystal panel using color filters.

Figure 16:
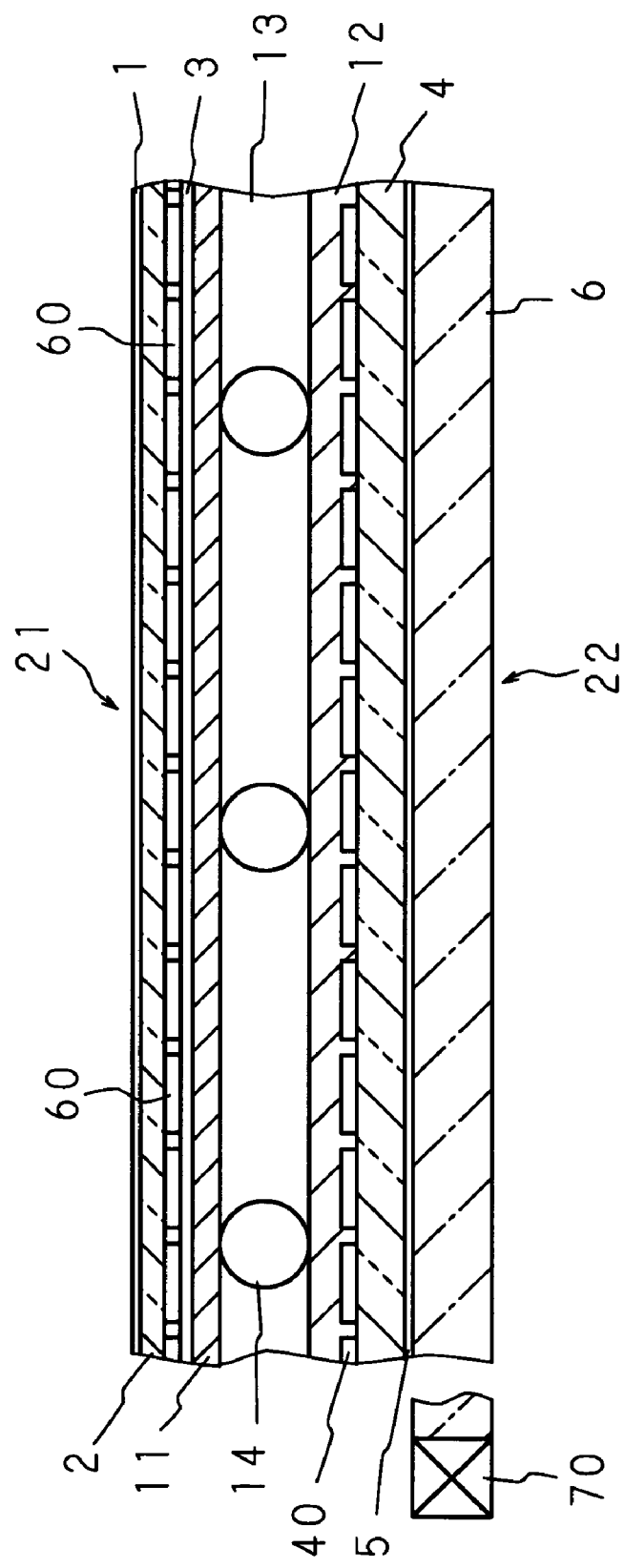
FIG. 16 is a schematic cross sectional view of a color-filter type liquid crystal panel and back-light.

FIG. 16 is a schematic cross sectional view of the liquid crystal panel and back-light of such a liquid crystal display device. In FIG. 16, the same members as in FIG. 8 are designated with the same numeric numbers, and the detailed explanation thereof is omitted. The common electrode 3 is provided with color filters 60 of the three primary colors (R, G, B). Besides, the back-light 22 is composed of a white light source 70 for emitting white light, and a light guiding/diffusing plate 6. In such a color-filter type liquid crystal display device, a color display is performed by selectively transmitting white light from the white light source 70 through the color filters 60 in a plurality of colors.

Concrete examples will be explained below. After washing a TFT substrate having pixel electrodes 40 (pixel number: 1024×RGB×768, diagonal: 15 inches) and a color filter substrate having a common electrode 3, they were coated with polyimide and baked for one hour at 200° C. to form about 200 Å thick polyimide films as alignment films 11 and 12. Further, these alignment films 11 and 12 were rubbed with a rayon fabric, and an empty panel was fabricated by stacking the two substrates so that the rubbing directions were parallel and maintaining a gap therebetween by spacers 14 made of silica having an average particle size of 1.6 μm.

A ferroelectric liquid crystal material showing the phase sequence of isotropic phase—cholesteric phase—chiral smectic C phase from the higher temperature side and a monostable electro-optic response was sealed between the alignment films 11 and 12 of this empty panel to form a liquid crystal layer 13, and an alignment process was performed by applying a DC voltage of 10 V to the liquid crystal layer 13 in a temperature range of ±3° C. from the transition temperature to the chiral smectic C phase from the cholesteric phase (100 to 94° C.). In the alignment process, the liquid crystal was heated to the cholesteric phase (105° C.) once, and then cooled down to room temperature (25° C.) by fixing the cooling rate at −1° C./minute. With this alignment process, uniform liquid crystal alignment was obtained. The magnitude of spontaneous polarization of the sealed liquid crystal material was 9 nC/cm$^2$, and the maximum value of an angle formed by an average molecular axis of a liquid crystal molecular director in the absence of applied voltage and an average molecular axis of a liquid crystal molecular director in the presence of applied voltage was 54°. A liquid crystal panel 21 was produced by sandwiching the fabricated panel by two polarization films 1 and 5 arranged in a crossed-Nicol state, and the average molecular axis of liquid crystal molecular director in the absence of applied voltage was substantially aligned with the polarization axis of one of the polarization films to provide a dark state.

Figure 17:
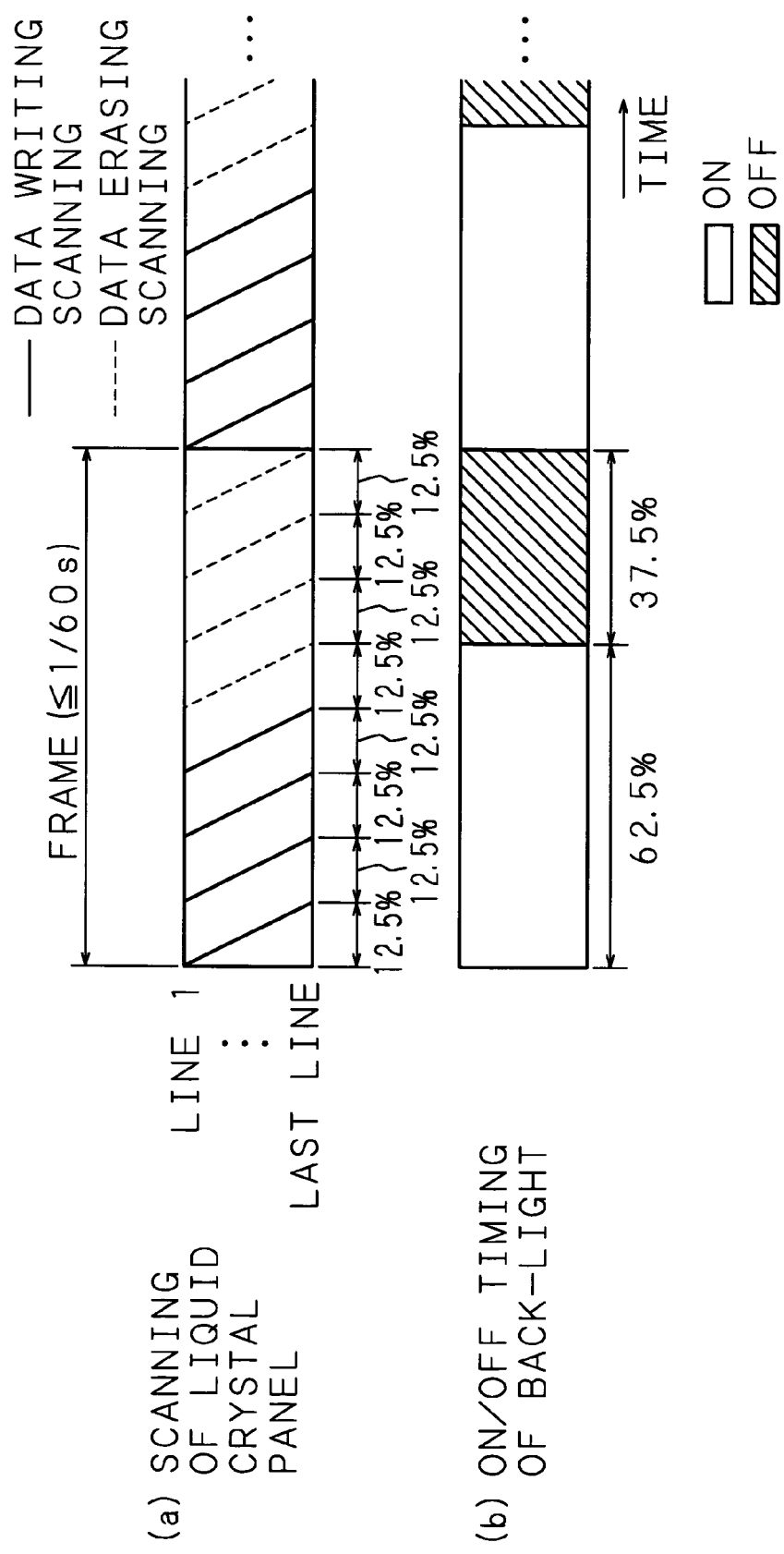
FIGS. 17(a) and (b) are time charts showing display control in a liquid crystal display device (the sixth embodiment) of the present invention.

The liquid crystal panel 21 thus fabricated and the back-light 22 comprising the white light source 70 made of a cold cathode tube as a light source were stacked one upon another, and a color display was performed by a color-filter method, according to a drive sequence as shown in FIG. 17.

FIG. 17(*a*) shows the scanning timing of each line of the liquid crystal panel 21, and FIG. 17(*b*) shows the ON/OFF timing of the back-light 22. In each frame, the data writing scanning is performed four times continuously, and then the data erasing scanning is performed four times continuously.

The applied voltages in the four data writing scanning operations and those in the four data erasing scanning operations are not necessarily equal in magnitude, and the applied voltage value in the second scanning is made not smaller than a cell voltage value just before the second scanning after the first scanning; the applied voltage value in the third scanning is made not smaller than a cell voltage value just before the third scanning after the second scanning; and the applied voltage value in the fourth scanning is made not smaller than a cell voltage value just before the fourth scanning after the third scanning. Besides, the applied voltages to each pixel in the data writing scanning and the data erasing scanning are substantially equal in magnitude, but opposite in polarity and applied order.

In each frame, the back-light 22 is turned on in synchronism with the start timing of the first data writing scanning, and turned off in synchronism with the end timing of the first data erasing scanning.

Figure 18:
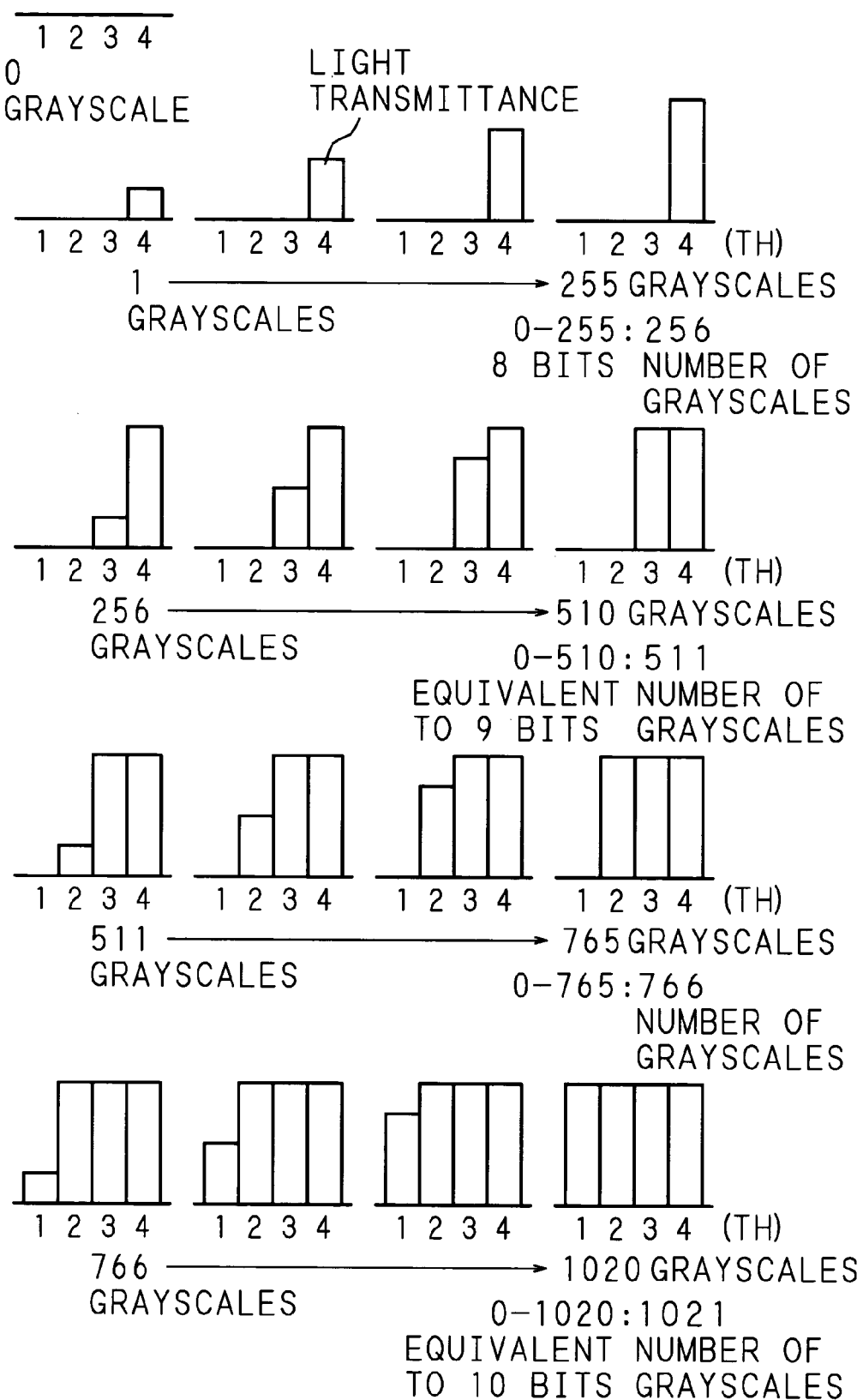
FIG. 18 shows an example of grayscale display by the liquid crystal display device (the sixth embodiment) of the present invention.

FIG. 18 shows an example of such a grayscale display in which the number (N) of writing is four times and the number (M) of driver's output grayscales is 256. In each sub-frame, the lowest grayscale levels (0 to 255 grayscales) are displayed by the fourth voltage application (data writing scanning); grayscale levels (256 to 510 grayscales) higher (brighter) than the display of grayscales by the fourth voltage application (data writing scanning) are displayed by a combination of the third voltage application and fourth voltage application (data writing scanning); grayscale levels (511 to 765 grayscales) higher (brighter) than the display of grayscales by the combination of the third voltage application and fourth voltage application (data writing scanning) are displayed by a combination of the second voltage application through fourth voltage application (data writing scanning); and grayscale levels (766 to 1020 grayscales) higher (brighter) than the display of grayscales by the combination of the second voltage application through fourth voltage application (data writing scanning) are displayed by a combination of the first voltage application through fourth voltage application (data writing scanning).

Accordingly, it is possible to display 0 to 1020 grayscales (the number of grayscales is 1021) greater than 0 to 255 grayscales (the number of grayscales is 256) of the output grayscales of the data driver 32 for each color, and achieve a full-color equivalent to that of 10-bit data driver by the 8-bit data driver 32.

Note that although the above-described embodiments illustrate the case where a ferroelectric liquid crystal having half-V-shaped light transmittance characteristics is used as shown in FIG. 11, the same effects can also be obtained with the use of a ferroelectric liquid crystal having V-shaped light transmittance characteristics, or an antiferroelectric liquid crystal. In other words, the liquid crystal to be used is not particularly limited if it has spontaneous polarization, and every liquid crystal having spontaneous polarization can be used.

Moreover, although the LED light source is used as the light source of the field-sequential method, the light source is not particularly limited if it is a light source capable of being switched, such as an EL.

Further, in the case where a greater number of grayscales than the number of output grayscales of the data driver is realized by performing scanning a plurality of times, in the third, fourth and sixth embodiments, if the grayscale level in the previous scanning is not 0, the applied voltage is adjusted so that the grayscale level (light transmittance) in the next scanning becomes the maximum output grayscale number of the data driver. However, a combination for obtaining a predetermined grayscale level (light transmittance) is, of course, not limited to the above-illustrated examples.

As described above, in the present invention, within one period (within a frame in the case of the color-filter method, or within a sub-frame in the case of the field-sequential method), since voltage of the same polarity is applied to the liquid crystal material two or more times continuously through the switching element, it is possible to achieve a high light transmittance even at a low drive voltage with a liquid crystal display device using a liquid crystal material having spontaneous polarization.

Moreover, in the present invention, since the voltage of the same polarity which is applied a plurality of times within one period (frame or sub-frame) is varied, it is possible to display a greater number of grayscales than the number of output grayscales of the data driver, thereby achieving a high quality image display.

Further, in the present invention, particularly, in a low-temperature environment, since voltage of the same polarity is applied a plurality of times within one period (frame or sub-frame), it is possible to improve the display characteristics in the low-temperature environment.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A liquid crystal display device having a liquid crystal material with spontaneous polarization sealed between a common electrode and a plurality of pixel electrodes, and switching elements provided to correspond with said plurality of pixel electrodes, respectively, comprising
   an applying unit for applying voltage of same polarity to said liquid crystal material through said switching elements a plurality of times continuously within one frame or one sub-frame, and
   wherein at least two voltages among the voltages applied to said liquid crystal material by the plurality of times of voltage application are different in magnitude.

2. The liquid crystal display device of claim 1, wherein the voltages applied to said liquid crystal material by the plurality of times of voltage application are equal in magnitude.

3. A liquid crystal display device having a liquid crystal material with spontaneous polarization sealed between a common electrode and a plurality of pixel electrodes, and switching elements provided to correspond with said plurality of pixel electrodes, respectively, comprising
   an applying unit for applying voltage of same polarity to said liquid crystal material through said switching elements a plurality of times continuously within one period, wherein
   at least two voltages among the voltages applied to said liquid crystal material by the plurality of times of voltage application are different in magnitude, and
   a magnitude of the voltage applied for the (n+1)th (n: natural number) time is not less than a magnitude of the voltage applied for the nth time.

4. A liquid crystal display device having a liquid crystal material with spontaneous polarization sealed between a common electrode and a plurality of pixel electrodes, and switching elements provided to correspond with said plurality of pixel electrodes, respectively, comprising
   an applying unit for applying voltage of same polarity to said liquid crystal material through said switching elements a plurality of times continuously within one period, wherein
   at least two voltages among the voltages applied to said liquid crystal material by the plurality of times of voltage application are different in magnitude, and
   a magnitude of the voltage applied for the (n+1)th (n: natural number) time is not less than a magnitude of the voltage of said liquid crystal material just before the (n+1)th application of voltage after the nth application of voltage.

5. The liquid crystal display device of claim 1, wherein a combination of magnitude of voltages to be applied to said liquid crystal material a plurality of times is set so as to display a predetermined grayscale level.

6. A liquid crystal display device having a liquid crystal material with spontaneous polarization sealed between a common electrode and a plurality of pixel electrodes, and switching elements provided to correspond with said plurality of pixel electrodes, respectively, comprising
   an applying unit for applying voltage of same polarity to said liquid crystal material through said switching elements a plurality of times continuously within one period, wherein
   a combination of magnitude of voltages to be applied to said liquid crystal material a plurality of times is set so as to display a predetermined grayscale level, and
   a greater number of grayscales are displayed compared to the number of output grayscales of said applying unit.

7. A liquid crystal display device having a liquid crystal material with spontaneous polarization sealed between a common electrode and a plurality of pixel electrodes, and switching elements provided to correspond with said plurality of pixel electrodes, respectively, comprising
   an applying unit for applying voltage of same polarity to said liquid crystal material through said switching elements a plurality of times continuously within one period, wherein a combination of magnitude of voltages to be applied to said liquid crystal material a plurality of times is set so as to display a predetermined grayscale level, and if the number of times of application of voltage of same polarity to said liquid crystal material within one period is N times (N: natural number), lowest grayscale levels are displayed by the Nth application of voltage, higher grayscale levels than the grayscale levels displayed by the Nth application of voltage are sequentially displayed by a combination of the Jth ($2 \leq j \leq N$) through Nth applications of voltage, and highest grayscale levels are displayed by a combination of the 1st through Nth applications of voltage.

8. The liquid crystal display device of claim 1, wherein, after applying voltages of same polarity to said liquid crystal material a plurality of times, said applying unit applies reverse voltages, which are reversed in polarity and equal in magnitude with respect to said applied voltages, to said liquid crystal material the same number of times as the plurality of times.

9. The liquid crystal display device of claim 8, wherein, the order of magnitude of the reverse voltages is opposite to the order of magnitude of the voltages of same polarity.

10. The liquid crystal display device of claim 1, wherein said liquid crystal material is a ferroelectric liquid crystal material.

11. The liquid crystal display device of claim 1, comprising a light source for emitting at least light of three primary colors,
wherein a color display is performed by switching the colors of light emitted by said light source in a time-divided manner in synchronism with on/off driving of said switching elements.

12. The liquid crystal display device of claim 1, comprising:
a light source for emitting white light; and
color filters in a plurality of colors,
wherein a color display is performed by selectively transmitting the emitted light from said light source through said color filters.

13. A liquid crystal display device having a liquid crystal material with spontaneous polarization sealed between a common electrode and a plurality of pixel electrodes, and switching elements provided to correspond with said plurality of pixel electrodes, respectively, comprising
an applying unit for applying voltage of same polarity to said liquid crystal material through said switching elements a plurality of times continuously within one period, wherein
after applying voltages of same polarity to said liquid crystal material a plurality of times, said applying unit applies reverse voltages, which are reversed in polarity and equal in magnitude with respect to said applied voltages, to said liquid crystal material the same number of times as the plurality of times, and
a back-light is turned off in synchronism with an end of the first application of the reverse voltage.

14. A liquid crystal display device having a liquid crystal material with spontaneous polarization sealed between a common electrode and a plurality of pixel electrodes, and switching elements provided to correspond with said plurality of pixel electrodes, respectively, comprising
a switching unit for switching between a first mode in which voltage of same polarity is applied to said liquid crystal material through said switching elements a plurality of times continuously within one frame or one sub-frame and a second mode in which voltage of same polarity is applied to said liquid crystal material through said switching elements once within the one frame or one sub-frame, and
wherein at least two voltages among said voltages of same polarity applied to said liquid crystal material are different in magnitude.

15. A liquid crystal display device having a liquid crystal material with spontaneous polarization sealed between a common electrode and a plurality of pixel electrodes, and switching elements provided to correspond with said plurality of pixel electrodes, respectively, comprising
a switching unit for switching between a first mode in which voltage of same polarity is applied to said liquid crystal material through said switching elements a plurality of times continuously within one period and a second mode in which voltage of same polarity is applied to said liquid crystal material through said switching elements once within the one period, wherein
said switching unit switches between the first mode and the second mode, based on temperature.

16. The liquid crystal display device of claim 14, wherein said liquid crystal material is a ferroelectric liquid crystal material.

17. The liquid crystal display device of claim 14, comprising a light source for emitting at least light of three primary colors,
wherein a color display is performed by switching the colors of light emitted by said light source in a time-divided manner in synchronism with on/off driving of said switching elements.

18. The liquid crystal display device of claim 14, comprising:
a light source for emitting white light; and
color filters in a plurality of colors,
wherein a color display is performed by selectively transmitting the emitted light from said light source through said color filters.

* * * * *